(12) United States Patent
Yu et al.

(10) Patent No.: US 11,800,501 B2
(45) Date of Patent: *Oct. 24, 2023

(54) RESOURCE INDICATION METHOD AND APPARATUS

(71) Applicant: Huawei Technologies Co., Ltd., Shenzhen (CN)

(72) Inventors: Jian Yu, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,437

(22) Filed: Feb. 15, 2022

(65) Prior Publication Data

US 2022/0256537 A1    Aug. 11, 2022

Related U.S. Application Data

(63) Continuation of application No. 16/735,059, filed on Jan. 6, 2020, now Pat. No. 11,284,388, which is a
(Continued)

(51) Int. Cl.
*H04W 88/00* (2009.01)
*H04W 72/0446* (2023.01)
(Continued)

(52) U.S. Cl.
CPC ....... *H04W 72/0446* (2013.01); *H04W 72/04* (2013.01); *H04W 72/1263* (2013.01); *H04W 72/23* (2023.01); *H04W 88/08* (2013.01)

(58) Field of Classification Search
CPC ... H04L 5/0007; H04L 5/0039; H04L 5/0044; H04L 5/0064; H04L 5/0091; H04L 27/26;
(Continued)

(56) References Cited

U.S. PATENT DOCUMENTS 7,656,832 B2    2/2010  Chun et al.
8,326,335 B2 *  12/2012 Ihm ........................ H04W 8/30
                                                          455/500
(Continued)

FOREIGN PATENT DOCUMENTS

CN    101292447 A    10/2008
CN    102013959 A    4/2011
(Continued)

OTHER PUBLICATIONS

"IEEE P802.11, Wireless LANs," doc.: IEEE 802.11-09/0992r20, Specification Framework for TGac, Jan. 2011, 51 pages.
(Continued)

*Primary Examiner* — Frank Duong
(74) *Attorney, Agent, or Firm* — Conley Rose, P.C.

(57) ABSTRACT

A resource indication method includes generating, by an access point, resource mapping information, where the resource mapping information includes a plurality of mapping segments, each mapping segment is associated with a frame type, each mapping segment includes a plurality of resource indicators, and each resource indicator indicates a resource allocated to a station in a frame corresponding to a frame type associated with a mapping segment to which the resource indicator belongs, and sending, by the access point, the resource mapping information.

20 Claims, 8 Drawing Sheets

Related U.S. Application Data continuation of application No. 15/667,157, filed on Aug. 2, 2017, now Pat. No. 10,560,936, which is a continuation of application No. PCT/CN2015/072122, filed on Feb. 2, 2015.

(51) Int. Cl.
*H04W 72/04* (2023.01)
*H04W 72/23* (2023.01)
*H04W 72/1263* (2023.01)
*H04W 88/08* (2009.01)

(58) Field of Classification Search
CPC ........... H04L 27/2602; H04L 27/2666; H04W 72/04; H04W 72/042; H04W 72/044; H04W 72/0453; H04W 72/0446; H04W 72/1263; H04W 84/12; H04W 88/08
See application file for complete search history.

(56) References Cited

U.S. PATENT DOCUMENTS

| | | | |
|---|---|---|---|
| 8,982,758 | B2 | 3/2015 | Gong et al. |
| 9,049,155 | B2 | 6/2015 | Vermani et al. |
| 9,198,125 | B2 | 11/2015 | Seok |
| 9,281,912 | B2 | 3/2016 | Peng et al. |
| 9,585,057 | B2 | 2/2017 | Seok et al. |
| 9,961,510 | B2 | 5/2018 | Merlin et al. |
| 10,278,210 | B2 | 4/2019 | Ahn et al. |
| 10,313,082 | B2 | 6/2019 | Kim et al. |
| 10,341,075 | B2 | 7/2019 | Kim et al. |
| 10,432,381 | B2 | 10/2019 | Kim et al. |
| 10,771,199 | B2 * | 9/2020 | Sridhara ............... H04L 1/1854 |
| 2007/0087724 | A1 | 4/2007 | Jang et al. |
| 2007/0115970 | A1 | 5/2007 | Jang et al. |
| 2008/0273513 | A1 | 11/2008 | Montojo et al. |
| 2010/0115369 | A1 | 5/2010 | Ihm et al. |
| 2010/0215002 | A1 * | 8/2010 | Kim ....................... H04W 72/04 370/329 |
| 2012/0099555 | A1 | 4/2012 | Yoshii et al. |
| 2013/0163525 | A1 | 6/2013 | Moon et al. |
| 2013/0182619 | A1 | 7/2013 | Tiirola et al. |
| 2013/0229996 | A1 | 9/2013 | Wang et al. |
| 2014/0254497 | A1 | 9/2014 | Ghosh et al. |
| 2015/0180559 | A1 | 6/2015 | Kim et al. |
| 2016/0029357 | A1 | 1/2016 | Lv et al. |
| 2017/0272138 | A1 | 9/2017 | Chun et al. |

FOREIGN PATENT DOCUMENTS

| | | |
|---|---|---|
| CN | 102971978 A | 3/2013 |
| CN | 104039013 A | 9/2014 |
| JP | 2009512386 A | 3/2009 |
| JP | 2009239541 A | 10/2009 |
| JP | 2010527543 A | 8/2010 |
| JP | 2012239179 A | 12/2012 |
| KR | 20050071620 A | 7/2005 |
| KR | 20060083931 A | 7/2006 |
| KR | 20100010927 A | 2/2010 |
| KR | 20110058713 A | 6/2011 |
| WO | 2007046620 A1 | 4/2007 |
| WO | 2011004613 A1 | 1/2011 |
| WO | 2013130793 A1 | 9/2013 |

OTHER PUBLICATIONS

"Part 11:Wireless LAN Medium Access Control (MAC) and Physical Layer (PHY) Specifications," IEEE Computer Society, IEEE Std 802.11, Mar. 29, 2012, 2793 pages.

"Part 11: Wireless LAN Medium Access Control(MAC) and Physical Layer (PHY) Specifications; Amendment 4: Enhancements for Very High Throughput for Operation in Bands below 6 GHz," 802.11ac-2013, 425 pages.

* cited by examiner

RESOURCE INDICATION METHOD AND APPARATUS

CROSS-REFERENCE TO RELATED APPLICATIONS

This application is a continuation of U.S. patent application Ser. No. 16/735,059, filed on Jan. 6, 2020, which is a continuation of U.S. patent application Ser. No. 15/667,157, filed on Aug. 2, 2017, now U.S. Pat. No. 10,560,936. which is a continuation of International Patent Application No. PCT/CN2015/072122, filed on Feb. 2, 2015. All of the aforementioned patent applications are hereby incorporated by reference in their entireties.

TECHNICAL FIELD

The present disclosure relates to the communications field, and in particular, to a resource indication method and an apparatus.

BACKGROUND

Currently, multi-user (MU) transmission has become a hotspot in development of a wireless local area network, for example, an MU multiple-input multiple-output (MU-MIMO) system and an orthogonal frequency division multiple access (OFDMA) system. Because of introduction of an MU transmission manner, to ensure that effective communication is performed between an access point and multiple stations using a specified resource block, overheads for indicating a resource to each station by the access point sharply increase.

For example, as shown in FIG. 1, an access point indicates resources to users/user groups in a station one by one in order to indicate information about a resource block that is used when the station sends a Media Access Control (MAC) frame to the access point or receives a MAC frame sent by the access point. A resource indicator for a single user (SU) may include a partial association identifier (PAID) that is used to identify a station, a downlink/uplink type that is used to indicate whether a resource block belongs to a downlink frame or an uplink frame, a modulation and coding scheme (MCS) that is used to indicate a modulation and coding scheme, a number of space-time streams (NSTS) that is used to indicate a quantity of space-time streams that are used, low-density parity-check code (LDPC) that is used to indicate whether an LDPC coding manner is used, a space time block code (STBC) that is used to indicate whether STBC is used, and the like. Similarly, for a resource indicator for an MU group, a PAID may be a group ID (GID) that is used to indicate an identifier of the user group.

The access point needs to use 60 bits to indicate a resource to a SU, and needs to use 84 bits to indicate a resource to a user group. However, a size of a response frame such as a block acknowledgement (BA) frame or an acknowledge (ACK) frame is only from 10 to 30 bytes (where 1 byte=8 bits). It may be learned that, in comparison with an actual size of the response frame, overheads are extremely large when the access point indicates a resource to such a response frame. Therefore, in other approaches, resource utilization is not high when an access point indicates a resource to a station.

SUMMARY

Embodiments of the present disclosure provide a resource indication method and an apparatus in order to resolve a problem that overheads are extremely large when an access point indicates a resource to each station, and improve resource utilization in resource indication.

To achieve the foregoing objective, the following technical solutions are used in the embodiments of the present disclosure.

According to a first aspect, an embodiment of the present disclosure provides a resource indication method, including generating, by an access point, resource mapping information, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs, and sending, by the access point, the resource mapping information.

With reference to the first aspect, in a first possible implementation manner of the first aspect, each mapping segment is further used to indicate a quantity of stations that need to send a frame corresponding to a frame type associated with the mapping segment.

With reference to the first aspect or the first possible implementation manner of the first aspect, in a second possible implementation manner of the first aspect, each resource indicator is further used to indicate a transmission parameter.

According to a second aspect, the present disclosure provides a resource indication method, including generating, by an access point, resource mapping information, where the resource mapping information includes multiple resource indicators, and each resource indicator is used to indicate a resource allocated to a station in a frame corresponding to a frame type, and sending, by the access point, the resource mapping information.

According to a third aspect, the present disclosure provides a resource indication method, including receiving, by a station, resource mapping information from an access point, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs, and determining, by the station according to the resource mapping information, a resource allocated by the access point to the station.

According to a fourth aspect, the present disclosure provides a resource indication method, including receiving, by a station, resource mapping information from an access point, where the resource mapping information includes multiple resource indicators, and each resource indicator is used to indicate a resource allocated to a station in a frame corresponding to a frame type, and determining, by the station according to the resource mapping information, a resource allocated by the access point to the station.

According to a fifth aspect, the present disclosure provides an access point including: a first resource allocation unit configured to generate resource mapping information, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs; and a first resource sending unit configured to send the resource mapping information generated by the first resource allocation unit.

With reference to the fifth aspect, in a first possible implementation manner of the fifth aspect, each mapping segment included in the first resource allocation unit is further used to indicate a quantity of stations that need to send a frame corresponding to a frame type associated with the mapping segment.

With reference to the fifth aspect or the first possible implementation manner of the fifth aspect, in a second possible implementation manner of the fifth aspect, each resource indicator included in the first resource allocation unit is further used to indicate a transmission parameter.

According to a sixth aspect, the present disclosure provides an access point including: a second resource allocation unit configured to generate resource mapping information, where the resource mapping information includes multiple resource indicators, and each resource indicator is used to indicate a resource allocated to a station in a frame corresponding to a frame type; and a second resource sending unit configured to send the resource mapping information generated by the second resource allocation unit.

According to a seventh aspect, the present disclosure provides a station including: a first resource receiving unit configured to receive resource mapping information from an access point, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs; and a first resource determining unit configured to determine, according to the resource mapping information received by the first resource receiving unit, a resource allocated by the access point to the station.

According to an eighth aspect, the present disclosure provides a station including: a second resource receiving unit configured to receive resource mapping information from an access point, where the resource mapping information includes multiple resource indicators, and each resource indicator is used to indicate a resource allocated to a station in a frame corresponding to a frame type; and a second resource determining unit configured to determine, according to the resource mapping information received by the second resource receiving unit, a resource allocated by the access point to the station.

According to a ninth aspect, the present disclosure provides an access point, where the access point includes a processor and a communications interface connected to the processor, where the processor is configured to generate resource mapping information, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs, and the communications interface is configured to send the resource mapping information generated by the processor.

With reference to the ninth aspect, in a first possible implementation manner of the ninth aspect, each mapping segment in the resource mapping information generated by the processor is further used to indicate a quantity of stations that need to send a frame corresponding to a frame type associated with the mapping segment.

With reference to the ninth aspect or the first possible implementation manner of the ninth aspect, in a second possible implementation manner of the ninth aspect, each resource indicator in the resource mapping information generated by the processor is further used to indicate a transmission parameter.

According to a tenth aspect, the present disclosure provides an access point, where the access point includes a processor and a communications interface connected to the processor, where the processor is configured to generate resource mapping information, where the resource mapping information includes multiple resource indicators, and each resource indicator is used to indicate a resource allocated to a station in a frame corresponding to a frame type, and the communications interface is configured to send the resource mapping information generated by the processor.

According to an eleventh aspect, the present disclosure provides a station, where the station includes a processor and a communications interface connected to the processor, where the communications interface is configured to receive resource mapping information from an access point, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs, and the processor is configured to determine, according to the resource mapping information received by the communications interface, a resource allocated by the access point to the station.

According to a twelfth aspect, the present disclosure provides a station, where the station includes a processor and a communications interface connected to the processor, where the communications interface is configured to receive resource mapping information from an access point, where the resource mapping information includes multiple resource indicators, and each resource indicator is used to indicate a resource allocated to a station in a frame corresponding to a frame type, and the processor is configured to determine, according to the resource mapping information received by the communications interface, a resource allocated by the access point to the station.

The embodiments of the present disclosure provide a resource indication method and an apparatus. An access point generates resource mapping information of multiple stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. In this way, the access point may deliver resource indicators of multiple types of frames to the multiple stations at the same time, and the access point determines a corresponding resource indicator for each type of downlink frame. Therefore, a problem of extremely large overheads that is caused because the access point indicates a resource to each station without distinguishing frame types is resolved, and transmission efficiency of resource indication is improved.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

Figure 1:
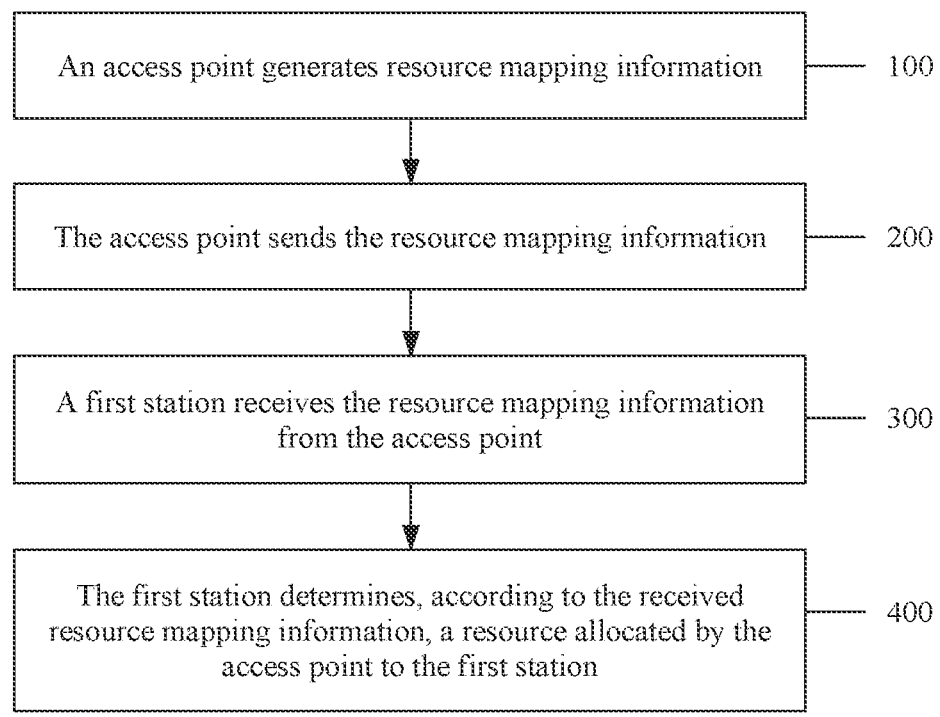
FIG. 1 is a schematic flowchart 1 of a resource indication method according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure.

In the embodiments of the present disclosure, a data frame sent by an access point to a station may be referred to as a downlink frame, and a data frame sent by a station to an access point may be referred to as an uplink frame.

Further, before sending a downlink frame to the station, the access point further needs to send a resource indicator to the station in order to notify the station of how to use an indicated resource to receive the downlink frame sent by the access point. In this way, the station may receive, according to a downlink frame receiving rule indicated by the resource indicator and at a resource location indicated by the resource indicator, the downlink frame sent by the access point.

Similarly, before sending an uplink frame to the access point, the station also needs to receive a resource indicator sent by the access point in order to learn, according to the resource indicator, a rule according to which the station sends the uplink frame to the access point and a resource location at which the station sends the uplink frame to the access point. In this way, the station sends the uplink frame to the access point according to the resource indicator, and the access point receives, according to an uplink frame receiving rule indicated by the resource indicator and at a resource location indicated by the resource indicator, the uplink frame sent by the station.

It may be learned that regardless of interaction of an uplink frame between an access point and a station or interaction of a downlink frame between an access point and a station, a resource indicator is required to indicate information about a resource used when the access point receives an uplink frame and/or sends a downlink frame, or the station receives a downlink frame and/or sends an uplink frame. However, because there are a variety of uplink frames and/or downlink frames, to ensure that effective communication is performed between an access point and multiple stations using a specified resource block, overheads in indicating a resource to each station by the access point sharply increase especially after introduction of a MU transmission manner.

For example, as shown in Table 1, a MAC frame is used as an example (when an access point sends a MAC frame to a station, the MAC frame is a downlink frame, and when a station sends a MAC frame to an access point, the MAC frame is an uplink frame), the MAC frame may be classified into a management frame, a control frame, and a data frame according to a type identifier, and each type of frame may be further classified into multiple frames of subtypes according to a subtype identifier.

TABLE 1

| Type identifier | Type description | Subtype identifier | Subtype description |
|---|---|---|---|
| 00 | (Management frame) Management | 0000 | Association Request |
| | | 0001 | Association Response |
| | | 0010 | Re-association Request |
| | | 0011 | Re-association Response |
| | | 0100 | Probe Request |
| | | 0101 | Probe Response |
| | | . . . | . . . |
| 01 | (Control frame) Control | 0100 | Beamforming (BF) Report Poll |
| | | . . . | . . . |
| | | 1011 | Request to Send (RTS) |
| | | 1100 | Clear to Send (CTS) |
| | | 1101 | ACK |
| | | . . . | . . . |
| 10 | (Data frame) Data | 0000 | Data |
| | | . . . | . . . |
| | | 1000 | Quality of Service Data (QoS Data) |
| | | . . . | . . . |
| | | 1110 | QoS Contention-free Poll (CF-Poll) (no data) |
| | | . . . | . . . |

It may be learned that, in other approaches, overheads of a method for indicating a resource to a user/user group in a station by an access point with regard to various uplink frames and/or downlink frames one by one are extremely large. Therefore, according to a resource indication method and an apparatus that are provided in the embodiments of the present disclosure, a problem of extremely large overheads in indicating a resource to each station by an access point may be resolved to some degrees, and transmission efficiency of resource indication is improved.

Embodiment 1

This embodiment of the present disclosure provides a resource indication method. As shown in FIG. 1, the method includes the following steps.

Step 100: An access point generates resource mapping information.

The resource mapping information may be MAP information, the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs.

Further, the multiple mapping segments included in the MAP information may be arranged in the MAP information according to a preset sequence, and the station also respectively reads, according to the preset sequence, the multiple mapping segments included in the MAP information. In this way, the access point does not need extra overheads to indicate, to the station, a frame type corresponding to each mapping segment. For example, as shown in Table 2, downlink MAP information includes a BA frame mapping segment and a data frame mapping segment, and uplink MAP information includes a BA frame mapping segment, a resource allocate request (RAR) frame mapping segment, and a data frame mapping segment. Each mapping segment is associated with a frame type, and each mapping segment includes multiple resource indicators. For example, the BA frame mapping segment includes a station identifier field (or a station GID field) and a transmission parameter field, and the transmission parameter field is used to indicate one or more of a resource block location, LDPC, an STBC, BF, an MCS, or an NSTS.

TABLE 2

| Downlink MAP information | BA frame mapping segment | Data frame mapping segment | |
|---|---|---|---|
| Uplink MAP information | BA frame mapping segment | RAR frame mapping segment | Data frame mapping segment |

Content of the BA frame mapping segment is associated with BA frames that need to be received by multiple stations. Further, the BA frame mapping segment may include multiple resource indicators, each resource indicator is associated with a station, and each resource indicator is used to indicate, to an associated station, one or more of LDPC, an STBC, BF, an MCS, an NSTS, or a resource block location at which the associated station receives a BA frame.

For example, content of the BA frame mapping segment in the downlink MAP information shown in Table 2 is as follows:

BA frame mapping segment:
Quantity of stations that need to receive a BA frame (3 bits)
First resource indicator:
{Initial guidance for a resource block
Resource block size
Identifier of a station 1
LDPC, STBC, BF, MCS, NSTS}
. . .
$N^{th}$ resource indicator:
{Initial guidance for a resource block
Resource block size
Identifier of a station N
LDPC, STBC, BF, MCS, NSTS}

Correspondingly, content of the data frame mapping segment is similar to the content of the foregoing BA frame mapping segment. A difference is that the data frame mapping segment is used to indicate a resource to multiple stations that need to receive a data frame. The data frame mapping segment may also include multiple resource indicators, each resource indicator is associated with a station, and each resource indicator is used to indicate, to an associated station, one or more of LDPC, an STBC, BF, an MCS, an NSTS, or a resource block location at which the associated station receives a data frame.

For example, content of the data frame mapping segment in the uplink MAP information is as follows:

Data frame mapping segment:
Quantity of stations that need to send a data frame (3 bits)
First resource indicator:
{SU or MU transmission mode
Initial guidance for a resource block
Resource block size
Identifier of a station 1
LDPC, STBC, BF, MCS, NSTS}
. . .
$N^{th}$ resource indicator:
{SU or MU transmission mode
Initial guidance for a resource block
Resource block size
Identifier of a station N
LDPC, STBC, BF, MCS, NSTS}

Similarly, the data frame mapping segment in the downlink MAP information is similar to the data frame mapping segment in the uplink MAP information. Further, because the station may need to return a BA frame to the access point after receiving a downlink data frame, the data frame mapping segment in the downlink MAP information may further include a BA frame mapping segment of an uplink BA frame. In this way, the access point does not need to send a resource indicator of the uplink BA frame to the station again. For example, content of the BA frame mapping segment included in the data frame mapping segment in the downlink MAP information is as follows:

Data frame mapping segment (downlink):
{
Quantity of stations that need to receive a data frame (3 bits)"
First resource indicator:
{SU or MU transmission mode
Initial guidance for a resource block
Resource block size
Identifier of a station 1
LDPC, STBC, BF, MCS, NSTS}
. . .
$N^{th}$ resource indicator:
{SU or MU transmission mode
Initial guidance for a resource block
Resource block size
Identifier of a station N
LDPC, STBC, BF, MCS, NSTS}
BA frame mapping segment (uplink):
First resource indicator:
{Initial guidance for a resource block
Resource block size
Identifier of a station 1
LDPC, STBC, BF, MCS, NSTS}
. . .
$N^{th}$ resource indicator:
{Initial guidance for a resource block
Resource block size
Identifier of a station N
LDPC, STBC, BF, MCS, NSTS}
}

Optionally, content of the RAR frame mapping segment in the uplink MAP information is as follows:

RAR frame mapping segment:
Quantity of stations that need to send an RAR frame (3 bits)
First resource indicator:
{Initial guidance for a resource block
Resource block size Identifier of a station 1
LDPC, STBC, BF, MCS, NSTS}
...
$N^{th}$ resource indicator:
{Initial guidance for a resource block
Resource block size
Identifier of a station N
LDPC, STBC, BF, MCS, NSTS}

It should be noted that, for content of an uplink frame mapping segment or a downlink frame (such as an ACK frame or a BA request (BAR) frame) mapping segment of another type in the MAP information, reference may also be made to the BA frame mapping segment, the data frame mapping segment, or the RAR frame mapping segment. This is not limited in the present disclosure.

Further, each mapping segment in the MAP information may further include frame type information corresponding to the mapping segment. For example, when frame type information is 01, it indicates that a field is a BA frame mapping segment, and when frame type information is 11, it indicates that a field is a data frame mapping segment. In this way, when generating the MAP information, the access point does not need to generate multiple mapping segments according to a preset frame type sequence. Instead, the access point flexibly indicates a location of each mapping segment in the MAP information using frame type information.

In addition, this embodiment of the present disclosure further provides another method for generating resource mapping information. Further, an access point does not divide resource mapping information generated by the access point into mapping segments. Correspondingly, the resource mapping information may include multiple resource indicators, and each resource indicator is used to indicate a resource allocated to a station in a frame corresponding to a frame type.

For example, as shown in Table 3, a resource indicator of each type of frame corresponding to each station may be flexibly configured in the foregoing resource mapping information. Each resource indicator includes frame type information, a station identifier field (or a station GID field), and a transmission parameter field that are corresponding to the resource indicator.

TABLE 3

| BA frame resource indicator of a station 1 | Data frame resource indicator of a station 1 | BA frame resource indicator of a station 2 | RAR frame resource indicator of a station 1 |
|---|---|---|---|

For example, content of the resource mapping information shown in Table 3 is as follows:

First resource indicator:
{BA frame type information
Initial guidance for a resource block
Resource block size
Identifier of a station 1
LDPC, STBC, BF, MCS, NSTS}
Second resource indicator:
{Data frame type information
Initial guidance for a resource block
Resource block size
Identifier of a station 1
LDPC, STBC, BF, MCS, NSTS}
Third resource indicator:
{BA frame type information
Initial guidance for a resource block
Resource block size
Identifier of a station 2
LDPC, STBC, BF, MCS, NSTS}
Fourth resource indicator:
{RAR frame type information
Initial guidance for a resource block
Resource block size
Identifier of a station 1
LDPC, STBC, BF, MCS, NSTS}

In this case, the access point generates the resource mapping information, and the resource mapping information includes a resource indicator of each type of frame of multiple stations or station groups.

In addition, in subsequent Embodiment 2 to Embodiment 4, a method for generating resource mapping information when an access point indicates a resource of a to-be-sent downlink frame to a station and a method for generating resource mapping information when an access point indicates an uplink frame to be received by the access point to a station are further described. Therefore, details are not described herein.

Step 200: The access point sends the resource mapping information.

After the access point generates the resource mapping information, the access point may generate a separate downlink frame according to the resource mapping information, and send the downlink frame to each station such that each station determines, according to a resource indicator in each mapping segment in the resource mapping information, a resource allocated by the access point to the station.

Alternatively, the access point may add the resource mapping information to a signaling field of a downlink data frame sent to each station or a MAC layer of the downlink data frame. In this way, each station receives the resource mapping information at the same time of receiving the downlink data frame in order to reduce signaling overheads of the station.

After step 100 and step 200 are performed, a first station may perform the following step 300 and step 400 in order to determine a resource allocated by the access point to the first station. The first station may be any one of the foregoing multiple stations.

Step 300: The first station receives the resource mapping information from the access point.

Step 400: The first station determines, according to the received resource mapping information, a resource allocated by the access point to the first station.

For example, the first station receives downlink resource mapping information. If the first station reads a station identifier of the first station in a first resource indicator in a first mapping segment, the first station receives, according to content of the first resource indicator, a first-type downlink frame sent by the access point. For example, the first station determines, according to the content of the first resource indicator, a transmission parameter such as initial guidance for a resource block used for receiving the first-type downlink frame, a resource block size, LDPC, an STBC, BF, an MCS, or an NSTS.

The first-type downlink frame is a downlink frame of a frame type corresponding to the first mapping segment, and the first resource indicator is used to indicate information about a resource that is used when the access point sends the first-type downlink frame to the first station.

In this case, an access point generates resource mapping information for multiple stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. Therefore, the station determines, according to the received resource mapping information, a specific resource allocated by the access point to the station. In this way, the access point may deliver resource indicators of multiple types of frames to the multiple stations at the same time, and the access point determines a corresponding resource indicator for each type of frame. Therefore, a problem of extremely large overheads that is caused because the access point indicates a resource to each station without distinguishing frame types is resolved, and transmission efficiency of resource indication is improved.

Embodiment 2

Figure 2:
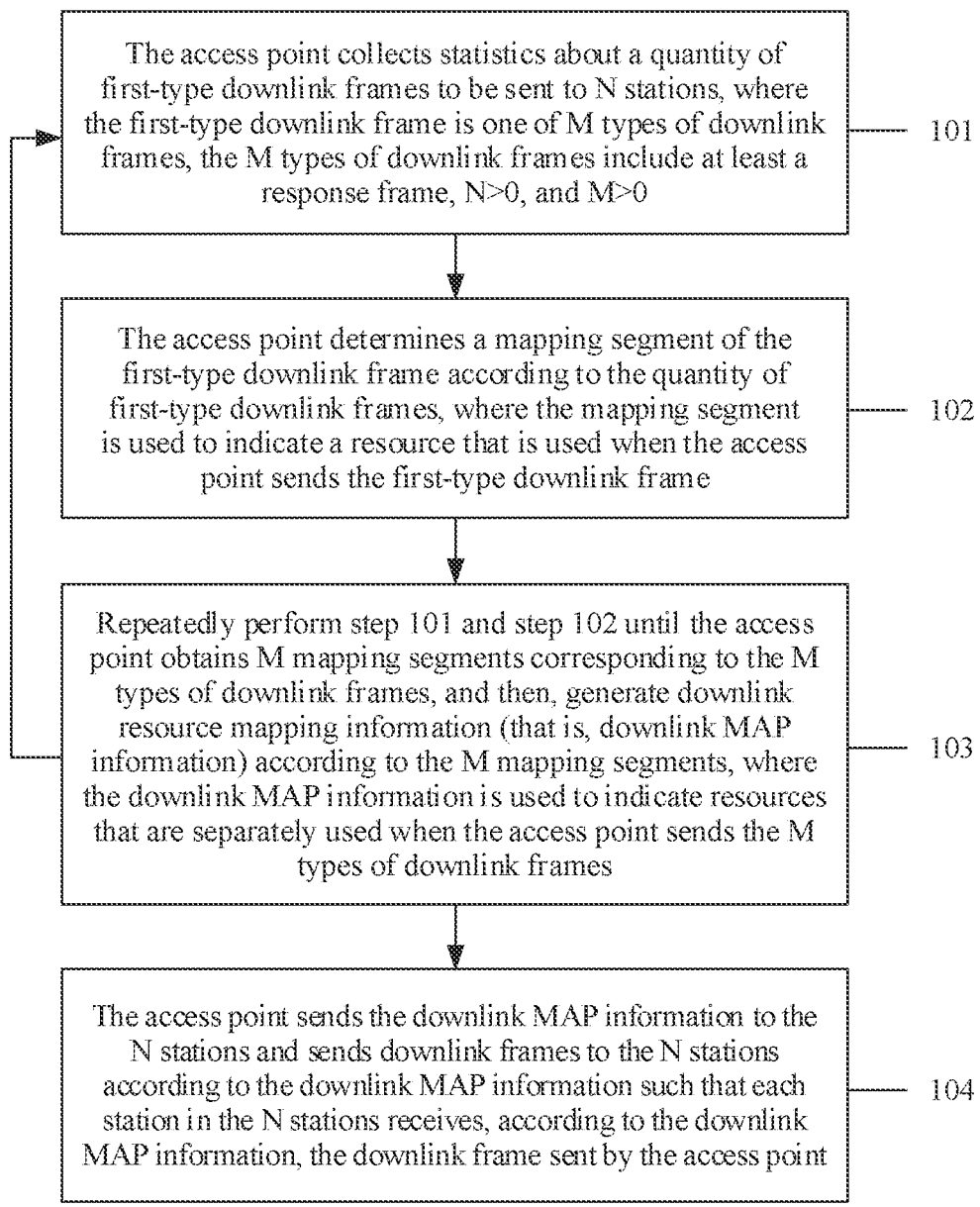
FIG. 2 is a schematic flowchart 2 of a resource indication method according to an embodiment of the present disclosure.

This embodiment of the present disclosure provides a resource indication method. For example, an access point indicates a resource of a to-be-sent downlink frame to a station. As shown in FIG. 2, the method includes the following steps.

Step 101: The access point collects statistics about a quantity of first-type downlink frames to be sent to N stations, where the first-type downlink frame is one of M types of downlink frames, the M types of downlink frames include at least a response frame, N>0, and M>0.

Step 102: The access point determines a mapping segment of the first-type downlink frame according to the quantity of first-type downlink frames, where the mapping segment is used to indicate a resource that is used when the access point sends the first-type downlink frame.

Step 103: Repeatedly perform step 101 and step 102 until the access point obtains M mapping segments corresponding to the M types of downlink frames, and then, generate downlink resource mapping information (that is, downlink MAP information) according to the M mapping segments, where the downlink MAP information is used to indicate resources that are separately used when the access point sends the M types of downlink frames.

Step 104: The access point sends the downlink MAP information to the N stations and sends downlink frames to the N stations according to the downlink MAP information such that each station in the N stations receives, according to the downlink MAP information, the downlink frame sent by the access point.

In step 101, the access point collects statistics about the quantity of first-type downlink frames to be sent to the N stations. The first-type downlink frame is one of the M types of downlink frames, the M types of downlink frames include at least the response frame, N>0, and M>0.

There may be multiple manners for determining the M types of downlink frames. For example, all downlink frames to be sent to the N stations may be classified into a management frame, a control frame, and a data frame, and the first-type downlink frame is any one of the management frame, the control frame, or the data frame. Alternatively, all downlink frames to be sent to the N stations may be classified into a response frame (such as a BA frame or an ACK frame) and a data frame, and the first-type downlink frame is either the response frame or the data frame.

For example, the access point needs to send four downlink frames to three stations. The access point needs to send a BA frame to a station 1, needs to send a data frame to a station 2, and needs to send a BA frame and a data frame to a station 3. If the first-type downlink frame is a BA frame, the access point learns, by means of statistics collection, that there are two BA frames in the four downlink frames that need to be sent to the three stations.

In step 102, after the access point learns the quantity of first-type downlink frames by means of statistics collection, the access point may determine, according to the quantity of first-type downlink frames, each resource indicator in the mapping segment corresponding to the first-type downlink frame. A first resource indicator is used as an example. The first resource indicator is used to indicate information about a resource that is used when the access point sends the first-type downlink frame to a first station, and the first station is any one of the N stations.

The example in the foregoing step 101 is still used. If the first-type downlink frame is a BA frame, and there are two BA frames, the access point may determine a BA frame mapping segment according to a quantity of BA frames. That is, specific downlink MAP information is designed for the two BA frames such that the three stations subsequently receive, according to the BA frame mapping segment, a BA frame sent by the access point.

Further, when generating the first resource indicator, the access point needs to determine a station identifier (PBAID or Partial BA ID) of a station (the first station) that requests the first-type downlink frame, and determine a transmission parameter that is used when the first station receives the first-type downlink frame. The transmission parameter includes at least one or more of a resource block location, LDPC, an STBC, BF, an MCS, or an NSTS. In this way, the access point may generate the first resource indicator for the first-type downlink frame, to indicate a resource that is used when the access point sends the first-type downlink frame.

For example, an example in which the first-type downlink frame is two BA frames is still used. The first resource indicator in the BA frame mapping segment is as follows:

BA frame mapping segment:
Quantity of stations that need to receive a BA frame (3 bits)
First resource indicator:
{
Initial guidance for a resource block (the initial guidance is 0 bits if the initial guidance is an indicator for consecutive resource blocks, and the initial guidance is 4/5/6 bits if the initial guidance is an indicator for non-consecutive resource blocks)
Resource block size (a field of the resource block size is 0 bits if a BA resource block size is fixed, and the resource block size is 1 bit if a BA resource block size is not fixed)

```
PBAID (1 to 3 bits)
LDPC (0/1 bit), STBC (0/1 bit), BF (0/1 bit), MCS (0/1/2/3/4 bits), NSTS
(0/1/2/3 bits)
    }
  . . .
  N^th resource indicator (reference may be made to content of the first
  resource indicator, and details are not described herein)
```

For the PBAID, if there are N stations that transmit the BA frame, an index of only $\log_2 N$ bits needs to be provided for a station identifier of a station that needs to transmit the BA frame. Further, if there are four stations that transmit the BA frame and the four stations include two SU stations and an MU group that includes two stations, station identifiers of the four stations that request the BA frame are separately: an SU station 2 (00), a first user station 3 (01) in the MU group, a second user station 4 (10) in the MU group, and an SU station 1 (11). It may be learned that the access point needs only 2 bits to identify the four stations that request the BA frame.

In addition, for a transmission parameter such as a resource block location, LDPC, an STBC, BF, an MCS, or an NSTS, the access point may indicate a resource using a default value (such as 0 bits). For example, when the station reads the first resource indicator in the BA frame mapping segment, if the first resource indicator does not clearly indicate a value of a resource block location, LDPC, an STBC, BF, an MCS, or an NSTS, the station receives, according to a default parameter and a default rule that are used for receiving or sending a downlink frame, a downlink frame sent by the access point.

In addition, an MCS is used as an example. Because an access point does not distinguish types of to-be-sent downlink frames in other approaches, the access point provides a 4-bit resource indicator for any type of downlink frame.

However, in the present disclosure, the foregoing BA frame is used as an example, and because the BA frame requires a relatively robust transmission mode, the BA frame generally needs to be transmitted using a relatively low MCS. Therefore, the access point may indicate an MCS to the station in the first resource indicator using a default value (that is, 0 bits). For example, a BA frame is always transmitted between the access point and the station using MCS=0, or the access point provides only 1 to 2 bits to indicate an MCS in a relatively robust manner. For example, if the access point provides a 1-bit MCS, the station may choose MCS=0 or MCS=1 to transmit a BA. Certainly, the access point may transmit a BA using a 0-bit default value and using a correspondence between an MCS of the BA frame and an MCS of a required response frame (such as a data frame). For example, an MCS in BA frame transmission is $MCS_{BA} = \max(MCS_{Data} - 2, 0)$, where $MCS_{Data}$ is an MCS of the data frame, and max(A, B) refers to a larger value between A and B.

It may be learned that, the examples in step 101 and step 102 are still used, and the first-type downlink frame is a BA frame. When the access point indicates a resource using a transmission parameter of a default value, the first resource indicator generated by the access point may be reduced to only 3+3 bits. In comparison with other approaches in which 60 bits are required to indicate a resource to an SU, overheads in indicating a resource by the access point are significantly reduced.

In addition, when the first-type downlink frame is a data frame, the first resource indicator generated by the access point may further carry an uplink resource indicator of a BA frame that needs to be returned after the station receives the data frame. For example, the first resource indicator is as follows:

```
Data frame mapping segment:
  Quantity of stations that need to receive a data frame (3 bits)
  First resource indicator:
  {
  Resource indicator of a data frame:
  SU/MU transmission mode
  Initial guidance for a resource block (the initial guidance is 0 bits if the
  initial guidance is an indicator for consecutive resource blocks, and the initial guidance is 4/5/6
  bits if the initial guidance is an indicator for non-consecutive resource blocks)
    Resource block size (4/5/6 bits)
    Station ID (1 to 14 bits)
    LDPC (1 bit), STBC (1 bit), BF (1 bit), MCS (4 bits), NSTS (3 bits)
  . . .
    Resource indicator of a BA frame corresponding to a data frame:
    Initial guidance for a resource block (the initial guidance is 0 bits if the
  initial guidance is an indicator for consecutive resource blocks, and the initial guidance is 4/5/6
  bits if the initial guidance is an indicator for non-consecutive resource blocks)
    Resource block size (the resource block size is 0 bits if a BA resource block
  size is fixed, and the resource block size is 1 bit if a BA resource block size is not fixed)
    PBAID (1 to 3 bits)
    LDPC (0/1 bit), STBC (0/1 bit), BF (0/1 bit), MCS (0/1/2/3/4 bits), NSTS
  (0/1/2/3 bits)
    }
```

It may be learned that, at the same time of indicating a resource of a downlink data frame, the access point further indicates a resource to each station to indicate how to send a BA frame according to the data frame. This further reduces resource overheads in indicating a resource to the station by the access point, and improves transmission efficiency of resource indication.

In step 103, because there may be M types of downlink frames to be sent by the access point to the N stations, and only the first-type downlink frame is used as an example for description in step 101 and step 102, the access point may repeatedly perform step 101 and step 102 until the access point obtains the M mapping segments that are in one-to-one correspondence with the M types of downlink frames.

It should be noted that, when repeatedly performing step 101 and step 102, the access point may first repeatedly perform step 101 to respectively collect statistics about quantities of the M types of downlink frames to be sent to the N stations, and then repeatedly perform step 102 to respectively determine the M mapping segments that are in one-to-one correspondence with the M types of downlink frames. Alternatively, the access point may perform step 101 and step 102 in a circulating manner until the access point obtains the M mapping segments that are in one-to-one correspondence with the M types of downlink frames. This is not limited in the present disclosure.

After the access point obtains the M mapping segments of the M types of downlink frames, the access point may generate the downlink MAP information according to the M mapping segments, and the downlink MAP information is used to indicate information of the resources that are separately used when the access point sends the M types of downlink frames.

Optionally, as shown in Table 4, the access point may combine the obtained M mapping segments into the downlink MAP information according to a preset sequence of M mapping segments in downlink MAP information. In this way, the downlink MAP information includes M mapping segments of each station in the N stations, and each station may read the downlink MAP information according to the preset sequence of M mapping segments in downlink MAP information. In addition, it should be noted that one or several types of resource indicators may be empty in the M mapping segments.

TABLE 4

| First mapping segment | . . . | $M^{th}$ mapping segment |
|---|---|---|

Alternatively, as shown in Table 5, the access point may separately determine frame type information of K (K≤M) mapping segments to be sent to the N stations, and the K mapping segments are information that is not empty in the M mapping segments. The access point may generate, according to the frame type information of the K mapping segments and the K mapping segments, downlink MAP information shown in Table 5. In this way, neither the access point nor the station needs to send or read downlink MAP information according to a preset resource indication sequence of M types of downlink frames, the access point may flexibly configure an indication sequence of the K mapping segments, and the station may read a corresponding mapping segment according to frame type information of each type of downlink frame.

TABLE 5

| Frame type information | First mapping segment | . . . | Frame type information | $K^{th}$ mapping segment |
|---|---|---|---|---|

Alternatively, as shown in Table 6, the access point may separately flexibly indicate resources to J (J≤M) types of downlink frames that need to be received by each station (group) in the N stations, and before indicating a resource to each station or station group, the access point first needs to indicate a frame type of each type of downlink frame of the access point. If there are $N_{SU}$ SU stations and $N_{MU}$ MU station groups, the $i^{th}$ SU station transmits $M_{SU,i}$ types of frames, and the $j^{th}$ MU station group transmits $M_{MU,j}$ types of frames, a quantity $N_{MAP}$ of all resource indicators is:

$$N_{MAP} = (M_{SU,1} + M_{SU,2} + \ldots + M_{SU,N_{SU}}) + (M_{MU,1} + M_{MU,2} + \ldots + M_{MU,N_{MU}})$$

In this way, the access point may generate totally $N_{MAP}$ resource indicators for all stations, and further the access point generates, according to the $N_{MAP}$ resource indicators and frame type information corresponding to each resource indicator, downlink MAP information shown in Table 6. Locations and a sequence of all types of resource indicators of all stations are not fixed, and there are totally $N_{MAP}$ resource indicators.

TABLE 6

| Frame type information | First resource indicator | . . . | Frame type information | $N_{MAP}^{th}$ resource indicator |
|---|---|---|---|---|

In addition, for the downlink MAP information, the access point may also bind information in several BA frames that need to be sent to multiple stations, to form multiple user BA (M-BA) frames. The access point may broadcast the M-BA frame to multiple stations that need to receive the BA frame, and indicate a resource of an M-BA frame using M-BA MAP information. Table 7 shows downlink MAP information including the M-BA MAP information, and the M-BA MAP information herein may be used as a special example of the first mapping segment in Table 4 or Table 5 in an M-BA frame scenario.

TABLE 7

| M-BA MAP information | . . . | $K^{th}$ mapping segment |
|---|---|---|

Because the M-BA information includes the information in the several BA frames to be received by the multiple stations, when a resource of the M-BA frame is to be indicated, identifier information of the station does not need to be indicated (identifier information of each user is in a field of an M-BA frame sent by the access point). For example, content of the M-BA MAP information is as follows:

Whether there is an M-BA frame (1 bit), or quantity of stations that need to receive an M-BA frame (3 bits)
  First resource indicator:
  {
    Initial guidance for a resource block (the initial guidance is 0 bits if the initial guidance is an indicator for consecutive resource blocks, and the initial guidance is 4/5/6 bits if the initial guidance is an indicator for non-consecutive resource blocks)

Resource block size (the resource block size is 0 bits if a resource block size of an M-BA frame is bound to a station quantity, or a relatively flexible size may be used for indication, for example, 4/5/6 bits)
    LDPC (0/1 bit), STBC (0/1 bit), BF (0/1 bit), MCS (0/1/2/3/4 bits), NSTS (0/1/2/3 bits)
}

In this case, the access point generates the downlink MAP information according to the M mapping segments, and the downlink MAP information is used to indicate the information of the resources that are separately used when the access point sends the M types of downlink frames.

In step 104, the access point sends the downlink MAP information generated in step 103 to the N stations and sends the M types of downlink frames to the N stations according to the downlink MAP information such that each station in the N stations receives, according to the downlink MAP information, the M types of downlink frames sent by the access point.

For example, if the downlink MAP information is shown in Table 4, the access point sends the downlink MAP information to the N stations, and the access point sends the M types of downlink frames to the N stations according to the downlink MAP information. Correspondingly, each station in the N stations reads the downlink MAP information according to the preset sequence of M types of the downlink frames in downlink MAP information. That is, each station first reads the first resource indicator (it is assumed that the first resource indicator is a resource indicator that is used when the first station receives a BA frame) in the first mapping segment. Because the first resource indicator includes an identifier of the first station, after reading the first resource indicator, the first station may receive, according to a transmission parameter in the first resource indicator, a BA frame sent by the access point, then read multiple resource indicators in remaining M−1 mapping segments, and receive, according to corresponding resource indicators, different types of downlink frames sent by the access point.

Optionally, when the access point sends the downlink MAP information to the N stations or when the access point sends the M types of downlink frames to the N stations according to the downlink MAP information, transmission may be performed in an OFDMA manner or an MU-MIMO manner. This is not limited in the present disclosure.

Figure 3:
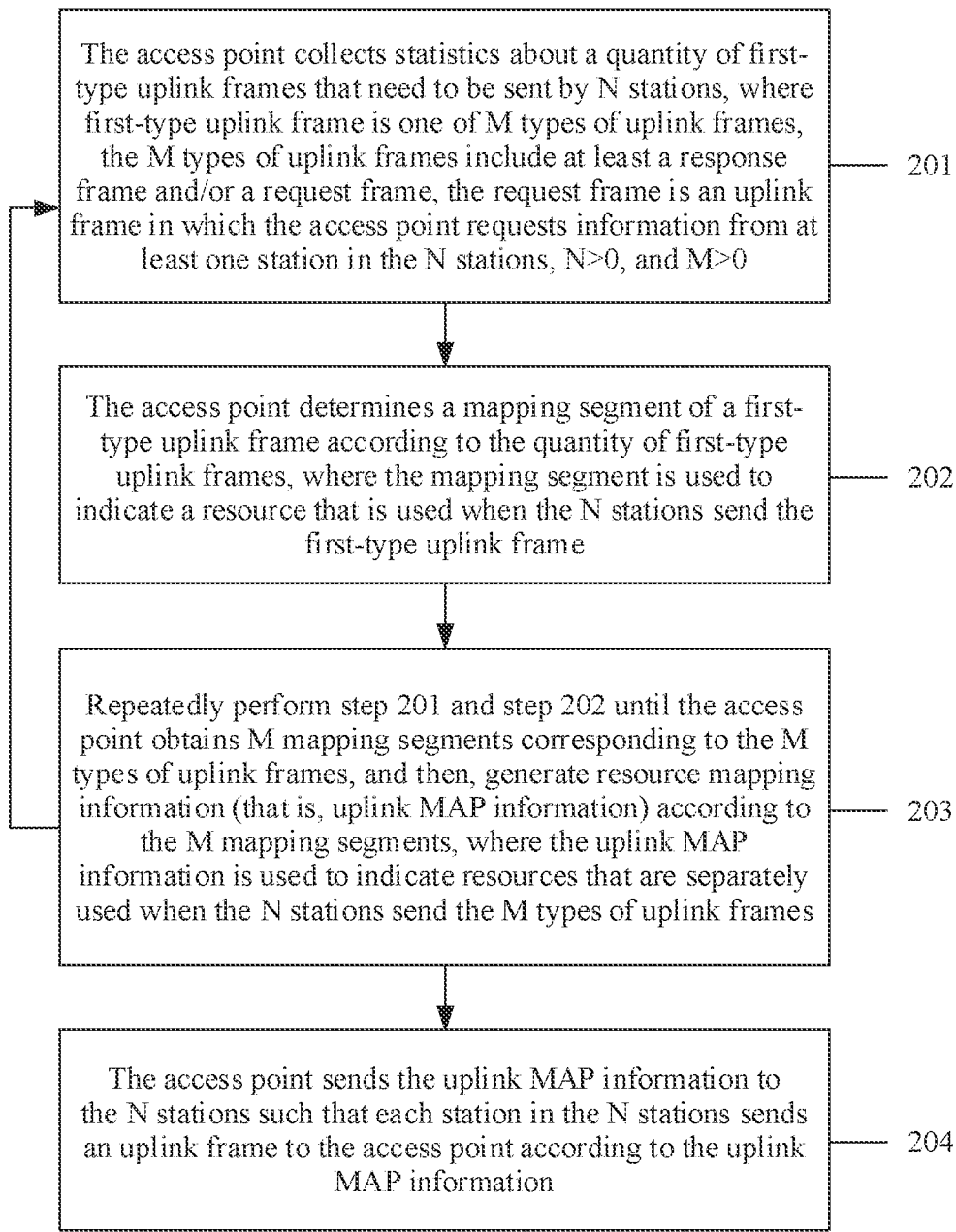
FIG. 3 is a schematic flowchart 3 of a resource indication method according to an embodiment of the present disclosure.

This embodiment of the present disclosure provides a resource indication method. For example, an access point indicates a resource of a to-be-received uplink frame to a station. As shown in FIG. 3, the method includes the following steps.

Step 201: The access point collects statistics about a quantity of first-type uplink frames that need to be sent by N stations, where the first-type uplink frame is one of M types of uplink frames, the M types of uplink frames include at least a response frame and/or a request frame, the request frame is an uplink frame in which the access point requests information from at least one station in the N stations, N>0, and M>0.

Step 202: The access point determines a mapping segment of a first-type uplink frame according to the quantity of first-type uplink frames, where the mapping segment is used to indicate a resource that is used when the N stations send the first-type uplink frame.

Step 203: Repeatedly perform step 201 and step 202 until the access point obtains M mapping segments corresponding to the M types of uplink frames, and then, generate resource mapping information (that is, uplink MAP information) according to the M mapping segments, where the uplink MAP information is used to indicate resources that are separately used when the N stations send the M types of uplink frames.

Step 204: The access point sends the uplink MAP information to the N stations such that each station in the N stations sends an uplink frame to the access point according to the uplink MAP information.

In step 201, similar to step 101, the access point collects statistics about the quantity of first-type uplink frames that need to be sent by the N stations, where the first-type uplink frame is one of the M types of uplink frames, the M types of uplink frames include at least the response frame and/or the request frame, the request frame is an uplink frame in which the access point requests information from at least one station in the N stations, N>0, and M>0.

A difference from step 101 is that the M types of uplink frames in step 201 refer to different types of uplink frames that are sent by the N stations and that are to be received by the access point. For a method for determining the M types of uplink frames, reference may be made to step 101, and therefore details are not described herein.

In addition, the M types of uplink frames may further include the request frame in addition to the response frame, and the request frame is an uplink frame in which the access point requests information from at least one station in the N stations, for example, an RAR frame, a BAR frame, or the like.

In step 202, after the access point collects statistics about the quantity of first-type uplink frames, the access point may determine, according to the quantity of first-type uplink frames, multiple resource indicators in the mapping segment corresponding to the first-type uplink frame. A first resource indicator is used as an example. The first resource indicator is used to indicate a resource that is used when the first station sends the first-type uplink frame to the access point.

Similar to step 102, when generating the first resource indicator, the access point needs to determine a station identifier of a station (the first station) that sends the first-type uplink frame, and determine a transmission parameter that is used when the first station sends the first-type uplink frame. The transmission parameter includes at least one or more of a resource block location, LDPC, an STBC, BF, an MCS, or an NSTS. In this way, the access point may generate multiple resource indicators for the first-type uplink frame, and the multiple resource indicators form the mapping segment corresponding to the first-type uplink frame.

For example, the first-type uplink frame is an RAR frame. A first resource indicator in an RAR frame mapping segment is as follows:

```
RAR frame mapping segment:
  Quantity of stations that need to send an RAR frame (3 bits)
  First resource indicator:
  {
  Initial guidance for a resource block (the initial guidance is 0 bits if the
initial guidance is an indicator for consecutive resource blocks, and the initial guidance is 4/5/6
bits if the initial guidance is an indicator for non-consecutive resource blocks)
  Resource block size (the resource block size is 0 bits if an RAR resource
block size is fixed, and the resource block size is 1 bit if an RAR resource block size is not fixed)
  Station identifier (less than or equal to 14 bits)
  LDPC (0/1 bit), STBC (0/1 bit), BF (0/1 bit), MCS (0/1/2/3/4 bits), NSTS
(0/1/2/3 bits)
  }
  . . .
  $N^{th}$ resource indicator (reference may be made to content of the first
resource indicator, and details are not described herein)
```

Similarly, for a transmission parameter such as a resource block location, LDPC, an STBC, BF, an MCS, or an NSTS, the access point may indicate a resource using a default value (0 bits). For example, when the station reads the first resource indicator of the RAR frame, if the first resource indicator does not clearly indicate a value of LDPC, an STBC, BF, an MCS, or an NSTS, the station sends an uplink frame according to a default uplink frame sending rule.

It may be learned that the access point performs implicit RAR frame polling on the station by generating the RAR frame mapping segment. If the station reads the first resource indicator that is for the RAR frame, the station may further send request information according to a transmission parameter indicated by the first resource indicator.

In addition, for a mapping segment of the RAR frame, a wild card may be designed for a station identifier. For example, all station identifiers are 0s, and in this case, the station identifier does not represent a specific station, but all stations or a group of stations are allowed to perform transmission in a contention manner. For example, the access point indicates an interval such as [5, 10] to the station, and all stations generate random numbers after receiving such an indicator. When a random number that is generated by a station falls within the interval, the station may choose any one of resource blocks whose station identifiers are all 0s in the mapping segment of the RAR frame in order to send the RAR frame.

In step 203, similar to step 103, because there may be M types of uplink frames to be sent by the N stations to the access point, and only the first-type uplink frame is used as an example for description in step 201 and step 202, the access point may repeatedly perform step 201 and step 202 until the access point obtains the M mapping segments corresponding to the M types of uplink frames.

Further, referring to Table 4, Table 5, and Table 6, a method for obtaining, by the access point, the M mapping segments that are in one-to-one correspondence with the M types of uplink frames is similar to step 103. A difference from step 103 is that the M mapping segments in this embodiment may include a mapping segment of the request frame.

In addition, it may be learned from steps 101 to 103 and steps 201 to 203 that, when generating a mapping segment of each type of downlink (uplink) frame, the access point needs 3 bits to indicate a station quantity, and extremely large overheads are caused when there are many types of downlink (uplink) frames (that is, when a value of M is relatively large). Therefore, the access point may collect, using a bitmap algorithm, statistics about a quantity of each type of downlink (uplink) frames to be sent to the N stations, and indicate a station quantity to the N stations. In this way, the access point does not need 3 bits to indicate a station quantity to indicate a resource in each type of downlink (uplink) frame.

For example, if a maximum quantity of scheduled stations is 8, and totally three types of uplink frames need to be sent by the stations, where the three types of uplink frames are separately a BA frame, an RAR frame, and a data frame, the access point may use conversion from 1 to 0 or from 0 to 1 to indicate a frame type change. For example, the access point indicates, to the eight stations, that a quantity of stations that need to send uplink frames is 11101111, where the first three digits 111 indicate that three stations send BA frames, the fourth digit 0 indicates that one station sends an RAR frame, and the last four digits 1111 indicate that four stations send data frames.

Alternatively, the access point may use 0 to represent a frame type change, and use 1 to represent a station quantity. For example, the access point indicates, to eight stations, that a quantity of stations that need to send uplink frames is 1110101111, the first three digits 111 indicate that three stations send BA frames, the fourth digit 0 indicates a frame type change, the fifth digit 1 indicates that one station sends an RAR frame, the sixth digit 0 indicates a frame type change, and the last four digits 1111 indicate that four stations send data frames.

In step 204, the access point sends the uplink MAP information generated in step 203 to the N stations such that each station in the N stations sends the M types of uplink frames to the access point according to the uplink MAP information. In addition, the access point also receives, according to a transmission parameter indicated by the uplink MAP information, the M types of uplink frames sent by the N stations, to ensure that the access point properly receives the M types of uplink frames.

Similarly, when the access point sends the uplink MAP information to the N stations or when the station sends the M types of uplink frames to the access point according to the uplink MAP information, transmission may be performed in an OFDMA manner or an MU-MIMO manner. This is not limited in the present disclosure.

Figure 4:
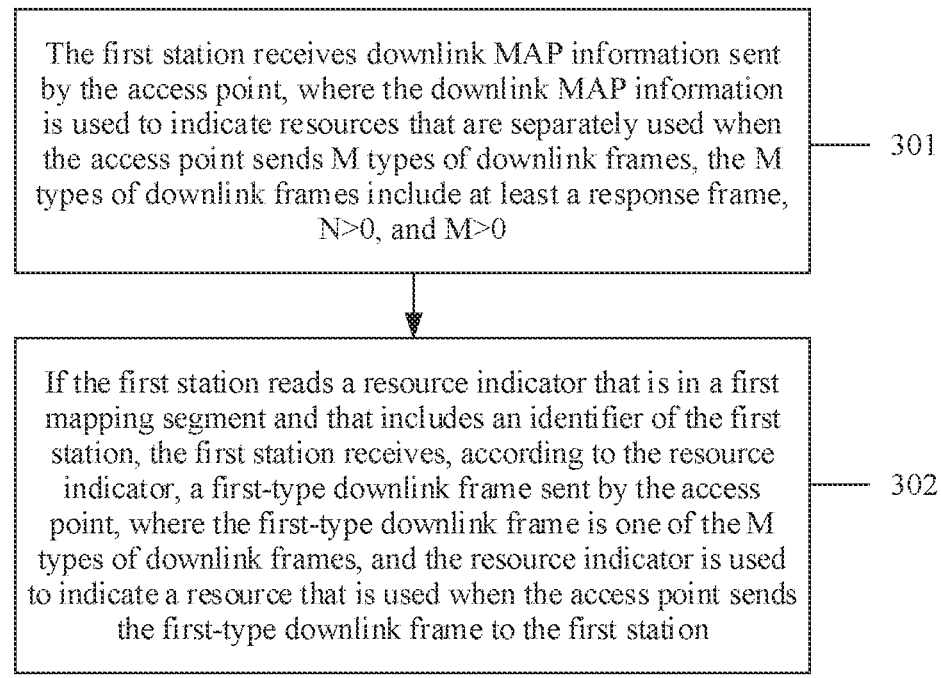
FIG. 4 is a schematic flowchart 4 of a resource indication method according to an embodiment of the present disclosure.

This embodiment of the present disclosure provides a resource indication method. For example, a first station receives a downlink frame according to MAP information sent by an access point. As shown in FIG. 4, the method includes the following steps.

Step 301: The first station receives downlink MAP information sent by the access point, where the downlink MAP information is used to indicate resources that are separately used when the access point sends M types of downlink frames, the M types of downlink frames include at least a response frame, N>0, and M>0.

Step 302: If the first station reads a resource indicator that is in a first mapping segment and that includes an identifier of the first station, the first station receives, according to the resource indicator, a first-type downlink frame sent by the access point, where the first-type downlink frame is one of the M types of downlink frames, and the resource indicator is used to indicate a resource that is used when the access point sends the first-type downlink frame to the first station.

In step 301, the first station receives downlink MAP information that is similar to the downlink MAP information sent by the access point in step 104. The downlink MAP information is used to indicate information about the resources that are separately used when the access point sends the M types of downlink frames, the M types of downlink frames include at least the response frame, N>0, and M>0.

In step 302, after the first station receives the downlink MAP information sent by the access point, if the first station learns, by means of reading, that the first mapping segment in the downlink MAP information includes the identifier of the first station, for example, a first resource indicator includes the identifier of the first station, the first station receives, according to the first resource indicator, the first-type downlink frame sent by the access point.

For example, if the downlink MAP information is shown in Table 4, because mapping segments are in a preset sequence in the downlink MAP information, and it is assumed that the first mapping segment includes a resource indicator of a BA frame, the first station reads the first resource indicator, and if the first station finds that the first resource indicator includes the identifier of the first station, the first station receives, according to a transmission parameter indicated by the first resource indicator, a BA frame sent by the access point.

Alternatively, if the downlink MAP information is shown in Table 5, because the downlink MAP information includes frame type information of each mapping segment, the first station first reads frame type information (it is assumed that the frame type information indicates a BA frame type) of the first mapping segment. Further, if the first station finds that the first resource indicator in the first mapping segment includes the identifier of the first station, the first station receives, according to a transmission parameter indicated by the first resource indicator, a BA frame sent by the access point.

In this case, the first station receives, by reading M mapping segments in the downlink MAP information, each type of downlink frame sent by the access point.

Figure 5:
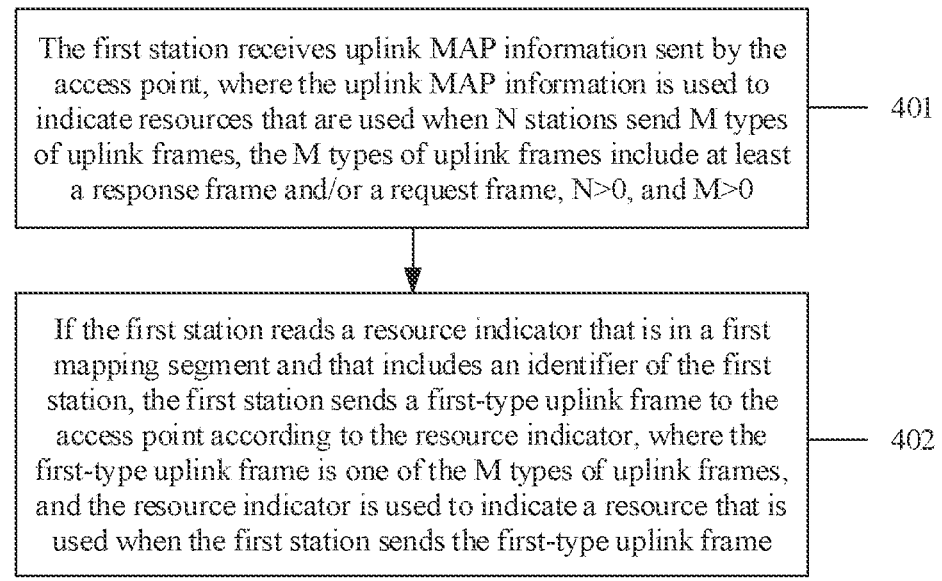
FIG. 5 is a schematic flowchart 5 of a resource indication method according to an embodiment of the present disclosure.

This embodiment of the present disclosure provides a resource indication method. For example, a first station sends an uplink frame according to MAP information sent by an access point. As shown in FIG. 5, the method includes the following steps.

Step 401: The first station receives uplink MAP information sent by the access point, where the uplink MAP information is used to indicate resources that are used when N stations send M types of uplink frames, the M types of uplink frames include at least a response frame and/or a request frame, N>0, and M>0.

Step 402: If the first station reads a resource indicator that is in a first mapping segment and that includes an identifier of the first station, the first station sends a first-type uplink frame to the access point according to the resource indicator, where the first-type uplink frame is one of the M types of uplink frames, and the resource indicator is used to indicate a resource that is used when the first station sends the first-type uplink frame.

In step 401, the first station receives uplink MAP information that is similar to the uplink MAP information sent by the access point in step 204, where the uplink MAP information is used to indicate information about the resources that are used when the N stations send the M types of uplink frames, the M types of uplink frames include at least the response frame and/or the request frame, N>0, and M>0.

In step 402, similar to step 302, after the first station receives the uplink MAP information sent by the access point, if the first station learns, by means of reading, that a resource indicator in the first mapping segment in the uplink MAP information includes the identifier of the first station, the first station sends the first-type uplink frame to the access point according to the resource indicator.

Similar to step 302, the uplink MAP information is shown in Table 4, Table 5, or Table 6. For how the first station sends the first-type uplink frame to the access point according to a first resource indicator, reference may be made to step 302, and therefore details are not described herein.

A difference from step 302 is that if the first resource indicator is a resource indicator of a request frame, the first station sends request information of the request frame to the access point according to the first resource indicator. The request frame includes at least an RAR frame and/or a BAR frame, and the first resource indicator includes the identifier of the first station.

For example, if the foregoing request frame is an RAR frame, the first station sends cache data and/or cache information of the first station to the access point according to the first resource indicator. The cache information is used to indicate attribute information of the cache data, such as a size of the cache data, a location of the cache data, or other information.

In this case, the first station sends each type of uplink frame to the access point by reading M mapping segments in the uplink MAP information.

This embodiment of the present disclosure provides a resource indication method. An access point generates resource mapping information of multiple stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. In this way, the access point may deliver resource indicators of multiple types of frames to the multiple stations at the same time, and the access point determines a corresponding resource indicator for each type of frame. Therefore, a problem of extremely large overheads that is caused because the access point indicates a resource to each station without distinguishing frame types is resolved, and transmission efficiency of resource indication is improved.

Embodiment 3

Figure 6:
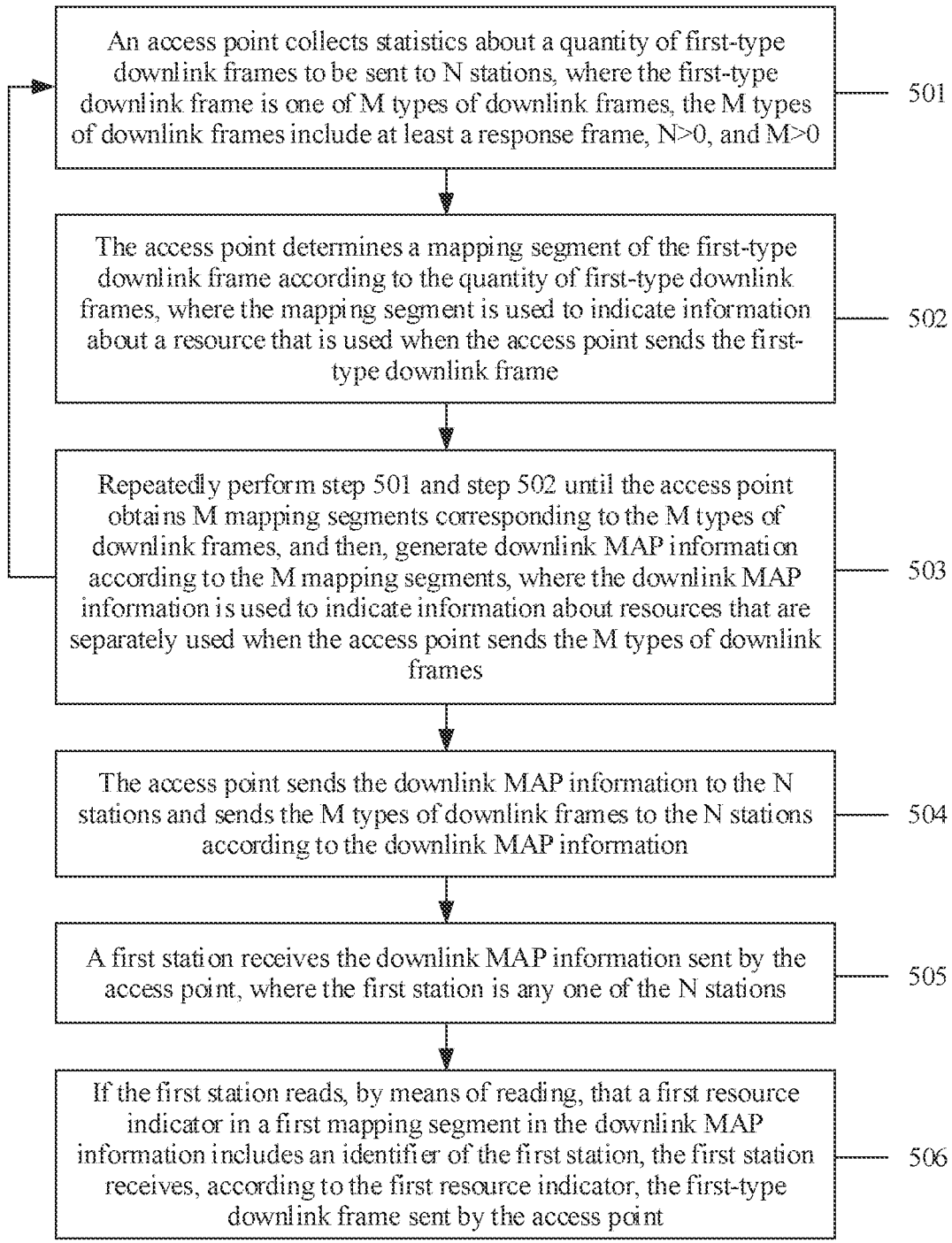
FIG. 6 is a schematic flowchart 6 of a resource indication method according to an embodiment of the present disclosure.

This embodiment of the present disclosure provides a resource indication method. As shown in FIG. 6, the method includes the following steps.

Step 501: An access point collects statistics about a quantity of first-type downlink frames to be sent to N stations, where the first-type downlink frame is one of M types of downlink frames, the M types of downlink frames include at least a response frame, N>0, and M>0.

Step 502: The access point determines a mapping segment of the first-type downlink frame according to the quantity of first-type downlink frames, where the mapping segment is used to indicate information about a resource that is used when the access point sends the first-type downlink frame.

Step 503: Repeatedly perform step 501 and step 502 until the access point obtains M mapping segments corresponding to the M types of downlink frames, and then, generate downlink MAP information according to the M mapping segments, where the downlink MAP information is used to indicate information about resources that are separately used when the access point sends the M types of downlink frames.

Step 504: The access point sends the downlink MAP information to the N stations and sends the M types of downlink frames to the N stations according to the downlink MAP information.

Step 505: A first station receives the downlink MAP information sent by the access point, where the first station is any one of the N stations.

Step 506: If the first station learns, by means of reading, that a first resource indicator in a first mapping segment in the downlink MAP information includes an identifier of the first station, the first station receives, according to the first resource indicator, the first-type downlink frame sent by the access point.

In step 501, the access point collects statistics about the quantity of first-type downlink frames to be sent to the N stations. The first-type downlink frame is one of the M types of downlink frames, the M types of downlink frames include at least the response frame, N>0, and M>0.

Further, for a manner for determining the M types of downlink frames, reference may be made to step 101, and details are not described herein. For example, in this embodiment of the present disclosure, in an example for detailed description, the access point needs to send four downlink frames to three stations.

The access point needs to send a BA frame to a station 1, needs to send a data frame to a station 2, and needs to send a BA frame and a data frame to a station 3. If the first-type downlink frame is a BA frame, the access point learns, by means of statistics collection, that there are two BA frames in the four downlink frames that need to be sent to the three stations. If the first-type downlink frame is a data frame, the access point learns, by means of statistics collection, that there are two data frames in the four downlink frames that need to be sent to the three stations.

In step 502, after the access point collects statistics about the quantity of first-type downlink frames, the access point may determine, according to the quantity of first-type downlink frames, multiple resource indicators in the mapping segment corresponding to the first-type downlink frame. A first resource indicator is used as an example. The first resource indicator is used to indicate a resource that is used when the access point sends the first-type downlink frame to the first station.

The example in the foregoing step 501 is still used. If the first-type downlink frame is a BA frame, and there are two BA frames, the access point may determine a BA frame mapping segment according to a quantity of BA frames. That is, specific downlink MAP information is designed for the two BA frames such that a station subsequently receives, according to the BA mapping segment, a BA frame sent by the access point.

Further, when generating a first resource indicator in the BA mapping segment, the access point needs to determine a station identifier of a station (the first station) that requests the first-type downlink frame, and determine a transmission parameter that is used when the first station receives the first-type downlink frame. The transmission parameter includes at least one or more of a resource block location, LDPC, an STBC, BF, an MCS, or an NSTS. In this way, the access point may generate the first resource indicator for the first-type downlink frame, to indicate information about a resource that is used when the access point sends the first-type downlink frame.

For example, the examples in step 501 and step 502 are still used, the first-type downlink frames are two BA frames, and a PBAID of the BA frame is 1 ($\log_2 2=1$) bit. If sizes of resource blocks for transmitting the two BA frames are fixed, and the resource blocks are consecutive resources, and default values are used when the BA frames are transmitted (that is, LDPC, an STBC, BF, an MCS, and an NSTS are all 0 bits), the BA mapping segment is as follows:

BA mapping segment:
Quantity of stations that need to receive a BA frame (3 bits)
First resource indicator:
Station 1:
PBAID (1 bit)
Second resource indicator:
Station 3:
PBAID (1 bit)
}

It may be learned that, when the first-type downlink frame is a BA frame, overheads in generating a mapping segment by the access point are only $3+N_{BA}\times 1=3+2\times 1=5$ bits ($N_{BA}$ is a quantity of stations that need to receive the BA frame). In comparison with other approaches in which overheads of 60 bits are required to indicate a resource to an SU, resource indication overheads of the access point are significantly reduced.

Alternatively, for example, the first-type downlink frames are two BA frames, and a PBAID of the BA frame is 1 bit. If sizes of resource blocks for transmitting the two BA frames are fixed, and the resource blocks are consecutive resources, an NSTS is limited to 1 to 4 space-time streams when the two BA frames are transmitted, that is, 2 ($\log_2 4=2$) bits are used to indicate a resource for an NSTS, and a default value is used for another transmission parameter (that is, LDPC, an STBC, BF, and an MCS are all 0 bits), and the BA mapping segment is as follows:

BA mapping segment:
Quantity of stations that need to receive a BA frame (3 bits)
First resource indicator:
Station 1:
PBAID (1 bit)
NSTS (2 bits)
Second resource indicator:
Station 3:
PBAID (1 bit)
NSTS (2 bits)

The foregoing is merely an example of content of the BA mapping segment. It should be noted that specific content of different mapping segments may be correspondingly changed according to preset rules for the access point and the station. This embodiment of the present disclosure does not set any limitation thereto.

In step 503, because there may be M types of downlink frames to be sent by the access point to the N stations, the access point may repeatedly perform step 501 and step 502 until the access point obtains the M mapping segments that are in one-to-one correspondence with the M types of downlink frames.

The examples in the foregoing step 501 and step 502 are still used. The access point separately collects statistics about a quantity of BA frames to be received by the three stations and a quantity of data frames to be received by three stations, and separately generates a first mapping segment of the BA frame and a second mapping segment of the data frame. In this case, the access point may generate, for the two mapping segments according to a preset sequence of mapping segments, downlink MAP information shown in Table 8, and the downlink MAP information is used to indicate information about resources that are separately used when the access point sends the two types of downlink frames.

TABLE 8

| (BA frame) first mapping segment | (data frame) second mapping segment |
| --- | --- |

Certainly, the access point generates the downlink MAP information according to multiple resource indicators using multiple methods. For details, reference may be made to step 103 in Embodiment 1, and the details are not described herein.

In step 504, the access point sends the downlink MAP information generated in step 503 to the N stations and sends multiple downlink frames to the N stations according to the downlink MAP information such that each station in the N stations receives, according to the downlink MAP information, the multiple downlink frames sent by the access point.

In step 505, the first station receives the downlink MAP information sent by the access point in step 504, and the first station is any one of the N stations.

In step 506, after the first station receives the downlink MAP information sent by the access point, if the first station learns, by means of reading, that the first resource indicator in the first mapping segment in the downlink MAP information includes the identifier of the first station, the first station receives, according to the first resource indicator, the first-type downlink frame sent by the access point.

For example, the examples in the foregoing steps 501 to 505 are still used, if the downlink MAP information is shown in Table 8, because mapping segments are in a preset sequence in the downlink MAP information, the first station first reads the first resource indicator in the first mapping segment, and if the first station finds that the first resource indicator includes the identifier of the first station, the first station receives, according to a transmission parameter indicated by the first resource indicator, a BA frame sent by the access point. If the first station learns, by means of reading, that a second resource indicator in the second mapping segment includes the identifier of the first station, the first station receives, according to a transmission parameter indicated by the second resource indicator, a data frame sent by the access point.

In this case, the first station obtains totally two mapping segments of the BA frame and the data frame according to the downlink MAP information sent by the access point, and respectively receives, according to the two mapping segments, the BA frame and the data frame that are sent by the access point. Similarly, each station in the N stations may receive, using the foregoing method, the downlink MAP information sent by the access point, and receives, according to the downlink MAP information, the downlink frame sent by the access point.

This embodiment of the present disclosure provides a resource indication method. An access point generates resource mapping information of multiple stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. In this way, the access point may deliver resource indicators of multiple types of frames to the multiple stations at the same time, and the access point determines a corresponding resource indicator for each type of frame. Therefore, a problem of extremely large overheads that is caused because the access point indicates a resource to each station without distinguishing frame types is resolved, and transmission efficiency of resource indication is improved.

Embodiment 4

Figure 7:
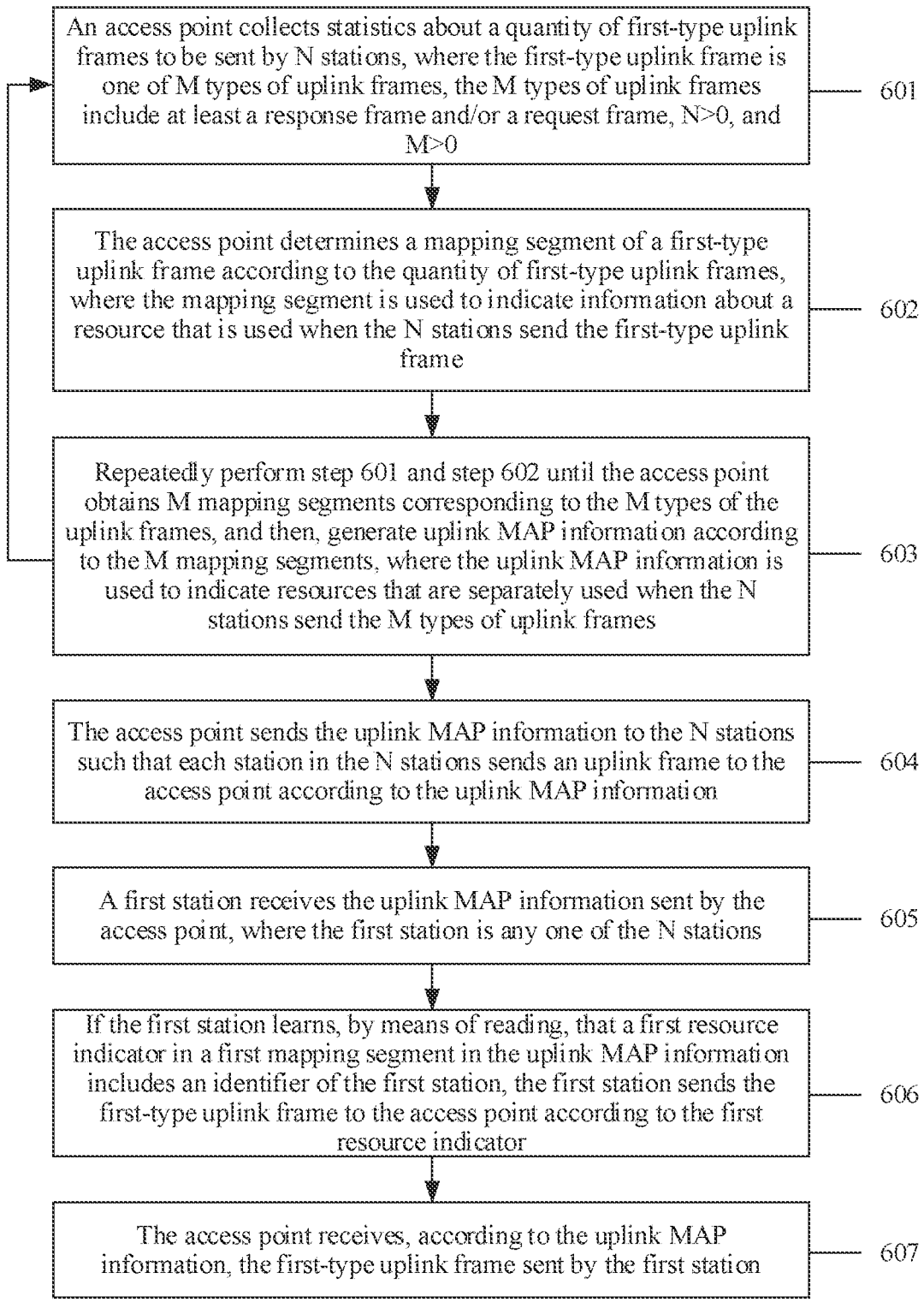
FIG. 7 is a schematic flowchart 7 of a resource indication method according to an embodiment of the present disclosure.

This embodiment of the present disclosure provides a resource indication method. As shown in FIG. 7, the method includes the following steps.

Step 601: An access point collects statistics about a quantity of first-type uplink frames that need to be sent by N stations, where first-type uplink frame is one of M types of uplink frames, the M types of uplink frames includes at least a response frame and/or a request frame, N>0, and M>0.

Step 602: The access point determines a mapping segment of a first-type uplink frame according to the quantity of first-type uplink frames, where the mapping segment is used to indicate information about a resource that is used when the N stations send the first-type uplink frame.

Step 603: Repeatedly perform step 601 and step 602 until the access point obtains M mapping segments corresponding to the M types of uplink frames, and then, generate uplink MAP information according to the M mapping segments, where the uplink MAP information is used to indicate resources that are separately used when the N stations send the M types of uplink frames.

Step 604: The access point sends the uplink MAP information to the N stations such that each station in the N stations sends an uplink frame to the access point according to the uplink MAP information.

Step 605: A first station receives the uplink MAP information sent by the access point, where the first station is any one of the N stations.

Step 606: If the first station learns, by means of reading, that a first resource indicator in a first mapping segment in the uplink MAP information includes an identifier of the first station, the first station sends the first-type uplink frame to the access point according to the first resource indicator.

Step 607: The access point receives, according to the uplink MAP information, the first-type uplink frame sent by the first station.

In step 601, similar to step 501, the access point collects statistics about the quantity of first-type uplink frames that need to be sent by the N stations. The first-type uplink frame is one of the M types of uplink frames, the M types of uplink frames include at least the response frame and/or the request frame, the request frame is an uplink frame in which the access point requests information from at least one station in the N stations, N>0, and M>0.

A difference from step 501 is that the M types of uplink frames in step 601 refer to different types of uplink frames that are sent by the N stations and that are to be received by the access point. In addition, the M types of uplink frames may further include the request frame in addition to the response frame, and the request frame is an uplink frame in which the access point requests information from at least one station in the N stations, for example, an RAR frame and a BAR frame.

In step 602, after the access point collects statistics about the quantity of first-type uplink frames, the access point may determine, according to the quantity of first-type uplink frames, multiple resource indicators in the mapping segment corresponding to the first-type uplink frame. A first resource indicator is used as an example, and the first resource indicator is used to indicate a resource that is used when the first station sends the first-type uplink frame to the access point.

Similar to step 502, when generating the first resource indicator, the access point needs to determine a station identifier of the first station that sends the first-type uplink frame, and determine a transmission parameter that is used when the first station sends the first-type uplink frame. The transmission parameter includes at least one or more of a resource block location, LDPC, an STBC, BF, an MCS, or an NSTS.

For example, it is assumed that the access point is to receive a BA frame and an RAR frame that are sent by a station 1, a BA frame sent by a station 2, and an RAR frame sent by a station 3. In addition, it is assumed that the three stations perform uplink transmission using a default transmission parameter when sending uplink frames to the access point. Therefore, if the first-type uplink frame is a BA frame, there are two first-type uplink frames. If a second-type uplink frame is an RAR frame, there are also two first-type uplink frames.

Content of an RAR frame mapping segment is as follows:

RAR frame mapping segment
Quantity of stations that need to send an RAR frame mapping segment (3 bits)
First resource indicator:
Station 1:
Station identifier (less than or equal to 14 bits)
Second resource indicator:
Station 3:
Station identifier (less than or equal to 14 bits)

It may be learned that the access point performs implicit RAR frame polling on the station by generating the RAR frame mapping segment. If a corresponding station reads a resource indicator that is for an RAR frame, the station may further send request information according to a transmission parameter indicated by the resource indicator. Similarly, for a BA frame mapping segment, reference may be made to the foregoing RAR frame mapping segment, and therefore details are not described herein.

In step 603, similar to step 503, because there may be M types of uplink frames to be sent by the N stations to the access point, the access point may repeatedly perform step 601 and step 602 until the access point obtains the M mapping segments that are in one-to-one correspondence with the M types of uplink frame.

The example in the foregoing step 602 is still used. The access point separately collects statistics about a quantity of RAR frames to be sent by the three stations and a quantity of BA frames to be sent by the three stations, and separately generates mapping segments of the RAR frame and the BA frame. In this case, the access point may generate, for the two mapping segments according to frame type information of each type of uplink frame (for example, it is assumed that 0 represents an RAR frame, and 1 represents a BA frame), uplink MAP information shown in Table 9, and the uplink MAP information is used to indicate resources that are separately used when he three stations send the two types of uplink frames.

TABLE 9

| 0 (RAR frame type) | First mapping segment | 1 (BA frame type) | Second mapping segment |
| --- | --- | --- | --- |

In step 604, the access point sends the uplink MAP information generated in step 603 to the N stations such that each station in the N stations sends an uplink frame to the access point according to the uplink MAP information.

In step 605, the first station receives the uplink MAP information sent by the access point in step 604, and the first station is any one of the N stations.

In step 606, after the first station receives the uplink MAP information sent by the access point, if the first station learns, by means of reading, that the first resource indicator in the first mapping segment in the uplink MAP information includes the identifier of the first station, the first station sends the first-type uplink frame to the access point according to the first resource indicator.

For example, the examples in the foregoing steps 601 to 605 are still used. The uplink MAP information is shown in Table 9. The first station first reads frame type information of the first mapping segment and determines that a frame type of the first mapping segment is an RAR frame, and further reads a first mapping segment of the RAR frame. If a first resource indicator in the first mapping segment includes the identifier of the first station, the first station sends cache data (that is, request information) of the first station to the access point according to a transmission parameter in the first resource indicator. Further, the first station reads frame type information of a second mapping segment and determines that a frame type of the second mapping segment is a BAR frame. If a second resource indicator in the second mapping segment includes the identifier of the first station, the first station sends a BA frame to the access point according to a transmission parameter by the second resource indicator.

It should be noted that BA frames may be divided into an instant BA frame and a delay BA frame according to different sending moments, and the uplink MAP information may include both a resource indicator of a BA frame and a resource indicator of a BAR frame. After receiving the two types of resource indicators, a station sends a BA frame to the access point. A difference is in the resource indicator of the BA frame, where an instant BA frame is requested from the station, that is, the BA frame is instantly requested after a data frame is sent, and in the BAR frame, a delay BA frame is requested from the station, that is, temporarily no frame is requested after a data frame is sent, and after a period of time, the access point centrally requests BA frames from the station using the resource indicator of the BAR frame.

Further, if the first station reads a resource indicator of a request frame in the uplink MAP information, the first station sends request information to the access point according to a specific type of the request frame. For example, if the request frame is a BAR frame, the first station sends a BA frame (that is, a delay BA frame) to the access point according to a resource indicator of the BAR frame, or if the request frame is an RAR frame, the first station sends cache data to the access point according to a resource indicator of the RAR frame or sends cache information of the first station to the access point according to a resource indicator of the RAR frame. For example, the cache information is used to indicate an attribute such as a cache data size. Certainly, the first station also sends both cache data and cache information to the access point according to the resource indicator of the RAR frame. This is not limited in the present disclosure.

In step 607, similar to step 606, after sending the uplink MAP information, the access point receives, according to a transmission parameter indicated by each resource indicator in the M mapping segments in the uplink MAP information, each type of uplink frame sent by the first station.

In this case, the first station obtains totally two mapping segments of the BA frame and the RAR frame according to the uplink MAP information sent by the access point, and respectively sends the BA frame and cache data to the access point according to the two mapping segments. The access point also receives, according to the two mapping segments in the uplink MAP information, the BA frame and the cache data that are sent by the first station. Similarly, each station in the N stations may receive, using the foregoing method, the uplink MAP information sent by the access point, and send the M types of uplink frames to the access point according to the uplink MAP information.

This embodiment of the present disclosure provides a resource indication method. An access point generates resource mapping information of multiple stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. In this way, the access point may deliver resource indicators of multiple types of frames to the multiple stations at the same time, and the access point determines a corresponding resource indicator for each type of frame. Therefore, a problem of extremely large overheads that is caused because the access point indicates a resource to each station without distinguishing frame types is resolved, and transmission efficiency of resource indication is improved.

Embodiment 5

Figure 8:
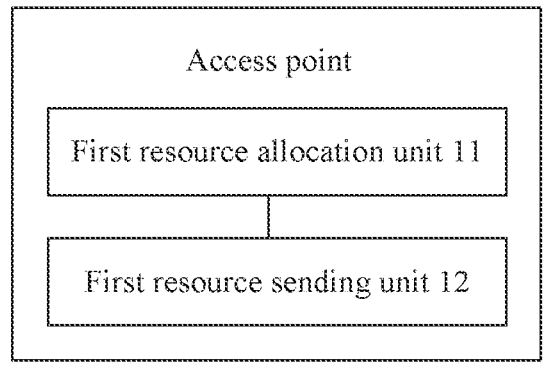
FIG. 8 is a schematic structural diagram 1 of an access point according to an embodiment of the present disclosure.

This embodiment of the present disclosure provides an access point. As shown in FIG. 8, the access point includes a first resource allocation unit 11 configured to generate resource mapping information, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs, and a first resource sending unit 12 configured to send the resource mapping information generated by the first resource allocation unit 11.

Further, each mapping segment included in the first resource allocation unit 11 is further used to indicate a quantity of stations that need to send a frame corresponding to a frame type associated with the mapping segment.

Further, each resource indicator included in the first resource allocation unit 11 is further used to indicate a transmission parameter.

Figure 9:
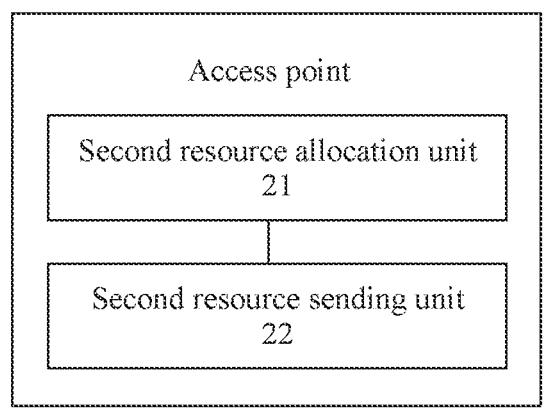
FIG. 9 is a schematic structural diagram 2 of an access point according to an embodiment of the present disclosure.

This embodiment of the present disclosure provides an access point. As shown in FIG. 9, the access point includes a second resource allocation unit 21 configured to generate resource mapping information, where the resource mapping information includes multiple resource indicators, and each resource indicator is used to indicate a resource allocated to a station in a frame corresponding to a frame type, and a second resource sending unit 22 configured to send the resource mapping information generated by the second resource allocation unit 21.

This embodiment of the present disclosure provides an access point. The access point generates resource mapping information of multiple stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. In this way, the access point may deliver resource indicators of multiple types of frames to the multiple stations at the same time, and the access point determines a corresponding resource indicator for each type of downlink frame. Therefore, a problem of extremely large overheads that is caused because the access point indicates a resource to each station without distinguishing frame types is resolved, and transmission efficiency of resource indication is improved.

Embodiment 6

Figure 10:
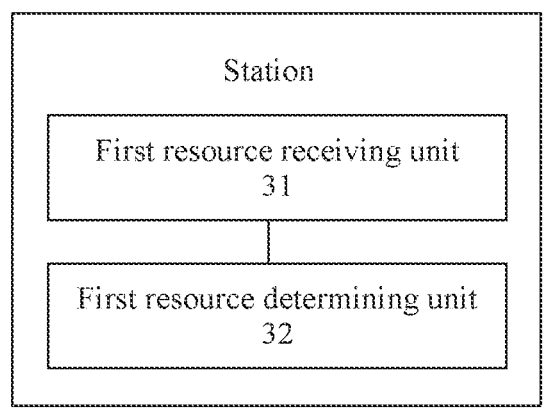
FIG. 10 is a schematic structural diagram 1 of a station according to an embodiment of the present disclosure.

This embodiment of the present disclosure provides a station. As shown in FIG. 10, the station includes a first resource receiving unit 31 configured to receive resource mapping information from an access point, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs, and a first resource determining unit 32 configured to determine, according to the resource mapping information received by the first resource receiving unit 31, a resource allocated by the access point to the station.

Figure 11:
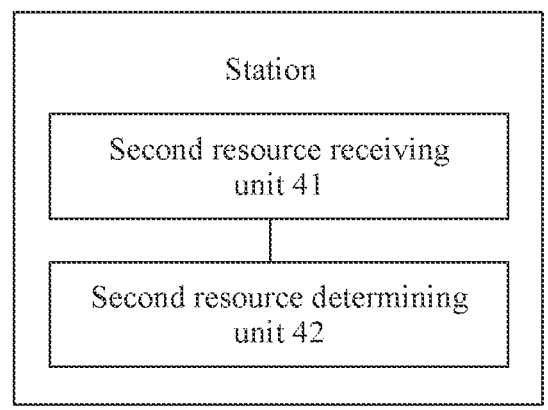
FIG. 11 is a schematic structural diagram 2 of a station according to an embodiment of the present disclosure.

This embodiment of the present disclosure provides a station. As shown in FIG. 11, the station includes a second resource receiving unit 41 configured to receive resource mapping information from an access point, where the resource mapping information includes multiple resource indicators, and each resource indicator is used to indicate a resource allocated to a station in a frame corresponding to a frame type, and a second resource determining unit 42 configured to determine, according to the resource mapping information received by the second resource receiving unit 41, a resource allocated by the access point to the station.

This embodiment of the present disclosure provides a station. An access point generates resource mapping information of multiple stations and sends the resource mapping information to the stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. In this way, the access point may deliver resource indicators of multiple types of frames to the multiple stations at the same time, and the access point determines a corresponding resource indicator for each type of downlink frame. Therefore, a problem of extremely large overheads that is caused because the access point indicates a resource to each station without distinguishing frame types is resolved, and transmission efficiency of resource indication is improved.

Embodiment 7

Figure 12:
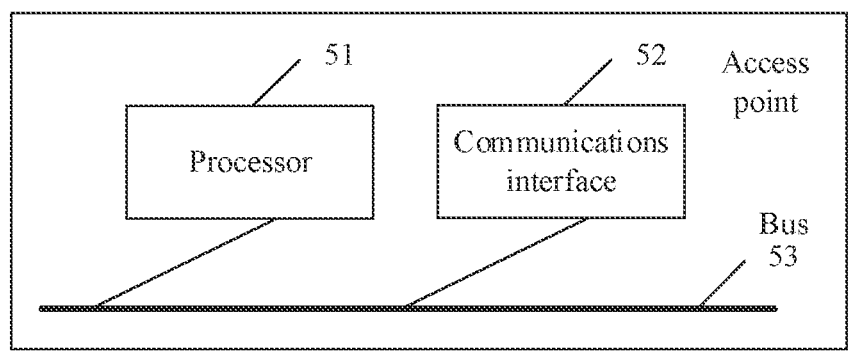
FIG. 12 is a schematic hardware diagram of an access point according to an embodiment of the present disclosure.

FIG. 12 shows a schematic hardware diagram of an access point according to the present disclosure.

As shown in FIG. 12, the access point includes a processor 51, a communications interface 52, and a bus 53

The processor 51 communicates with and is connected to the communications interface 52 using the bus 53.

The processor 51 is a control center of the access point, and the processor 51 performs various functions of the access point by processing data received by the communications interface 52 and invoking stored software or a stored program.

The communications interface 52 may be implemented by an optical communications interface, an electrical communications interface, a wireless communications interface, or any combination thereof. For example, the optical communications interface may be a small form-factor pluggable (SFP) communications interface (such as transceiver), an enhanced SFP (SFP+) communications interface, or a 10 Gigabit SFP (XFP) communications interface. The electrical communications interface may be an Ethernet network interface controller (NIC). The wireless communications interface may be a wireless NIC (WNIC). The access point may have multiple communications interfaces 52.

In an embodiment of the present disclosure, the processor 51 is configured to generate resource mapping information, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. The communications interface 52 is configured to send the resource mapping information generated by the processor 51.

Further, each mapping segment in the resource mapping information generated by the processor 51 is used to indicate a quantity of stations that need to send a frame corresponding to a frame type associated with the mapping segment.

Further, each resource indicator in the resource mapping information generated by the processor 51 is used to indicate a transmission parameter.

In another embodiment of the present disclosure, the processor 51 is configured to generate resource mapping information, where the resource mapping information includes multiple resource indicators, and each resource indicator is used to indicate a resource allocated to a station in a frame corresponding to a frame type. The communications interface 52 is configured to send the resource mapping information generated by the processor 51.

This embodiment of the present disclosure provides an access point. The access point generates resource mapping information of multiple stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. In this way, the access point may deliver resource indicators of multiple types of frames to the multiple stations at the same time, and the access point determines a corresponding resource indicator for each type of downlink frame. Therefore, a problem of extremely large overheads that is caused because the access point indicates a resource to each station without distinguishing frame types is resolved, and transmission efficiency of resource indication is improved.

Embodiment 8

Figure 13:
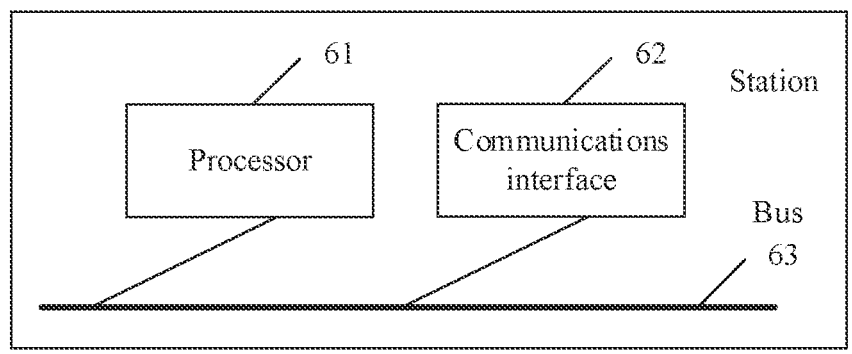
FIG. 13 is a schematic hardware diagram of a station according to an embodiment of the present disclosure.

FIG. 13 shows a schematic hardware diagram of a station according to the present disclosure.

As shown in FIG. 13, the station includes a processor 61, a communications interface 62, and a bus 63.

The processor 61 communicates with and is connected to the communications interface 62 using the bus 63.

The processor 61 is a control center of the station, and the processor 61 performs various functions of the station by processing data received by the communications interface 62 and invoking stored software or a stored program.

The communications interface 62 may be implemented by an optical communications interface, an electrical communications interface, a wireless communications interface, or any combination thereof. For example, the optical communications interface may be an SFP communications interface (such as a transceiver), an SFP+ communications interface, or an XFP communications interface. The electrical communications interface may be an Ethernet NIC. The wireless communications interface may be a WNIC. The station may have multiple communications interfaces 62.

In an embodiment of the present disclosure, the communications interface 62 is configured to receive resource mapping information from an access point, where the resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. The processor 61 is configured to determine, according to the resource mapping information received by the communications interface 62, a resource allocated by the access point to the station.

In another embodiment of the present disclosure, the communications interface 62 is configured to receive resource mapping information from an access point, where the resource mapping information includes multiple resource indicators, and each resource indicator is used to indicate a resource allocated to a station in a frame corresponding to a frame type. The processor 61 is configured to determine, according to the resource mapping information received by the communications interface 62, a resource allocated by the access point to the station.

This embodiment of the present disclosure provides a station. An access point generates resource mapping information of multiple stations and sends the resource mapping information to the stations. The resource mapping information includes multiple mapping segments, each mapping segment is associated with a frame type, each mapping segment includes multiple resource indicators, and each resource indicator is used to indicate a resource allocated to a station in a frame corresponding to a frame type associated with a mapping segment to which the resource indicator belongs. In this way, the access point may deliver resource indicators of multiple types of frames to the multiple stations at the same time, and the access point determines a corresponding resource indicator for each type of downlink frame. Therefore, a problem of extremely large overheads that is caused because the access point indicates a resource to each station without distinguishing frame types is resolved, and transmission efficiency of resource indication is improved.

The foregoing descriptions are merely example implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A resource indication method, comprising:
generating, by an access point, resource mapping information, wherein the resource mapping information comprises multiple resource indicators, and wherein each resource indicator indicates a resource allocated to a station in a frame corresponding to a frame type and a modulation and coding scheme (MCS); and
sending, by the access point, the resource mapping information.

2. The resource indication method of claim 1, wherein each resource indicator further indicates a quantity of stations that need to send the frame corresponding to the frame type associated with the resource indicator.

3. The resource indication method of claim 1, wherein each resource indicator further indicates a transmission parameter.

4. The resource indication method of claim 1, wherein the frame type comprises any one of a block acknowledge request (BAR) frame, a data request frame, or a resource allocate request (RAR) request frame.

5. A resource indication method, comprising:
receiving, by a first station, resource mapping information from an access point, wherein the resource mapping information comprises multiple resource indicators, and wherein each resource indicator indicates a resource allocated to a station in a frame corresponding to a frame type and a modulation and coding scheme (MCS); and
determining, by the first station according to the resource mapping information, a first resource allocated by the access point to the first station.

6. The resource indication method of claim 5, wherein each resource indicator further indicates a quantity of stations that need to send the frame corresponding to the frame type associated with each resource indicator.

7. The resource indication method of claim 5, wherein each resource indicator further indicates a transmission parameter.

8. The resource indication method of claim 5, wherein the frame type comprises any one of a block acknowledge request (BAR) frame, a data request frame, or a resource allocate request (RAR) request frame.

9. An access point, comprising:
a memory configured to store instructions; and
one or more processors in communication with the memory and configured to execute the instructions to:
generate resource mapping information, wherein the resource mapping information comprises multiple resource indicators, and wherein each resource indicator indicates a resource allocated to a station in a frame corresponding to a frame type and a modulation and coding scheme (MCS); and
send the resource mapping information.

10. The access point of claim 9, wherein each resource indicator further indicates a quantity of stations that need to send the frame corresponding to the frame type associated with each resource indicator.

11. The access point of claim 9, wherein each resource indicator further indicates a transmission parameter.

12. The access point of claim 9, wherein the frame type comprises a data request frame.

13. A station, comprising:
a memory configured to store instructions; and
one or more processors in communication with the memory and configured to execute the instructions to:
receive resource mapping information from an access point, wherein the resource mapping information comprises multiple resource indicators, and wherein each resource indicator indicates a resource allocated to a respective station in a frame corresponding to a frame type and a modulation and coding scheme (MCS); and
determine a first resource allocated by the access point to the station according to the resource mapping information.

14. The station of claim 13, wherein each resource indicator further indicates a quantity of stations that need to send the frame corresponding to the frame type associated with each resource indicator.

15. The station of claim 13, wherein each resource indicator further indicates a transmission parameter.

16. The station of claim 13, wherein the frame type comprises a data request frame.

17. The station of claim 13, wherein the frame type comprises a block acknowledge request (BAR) frame.

18. The station of claim 13, wherein the frame type comprises a resource allocate request (RAR) request frame.

19. The access point of claim 9, wherein the frame type comprises a block acknowledge request (BAR) frame.

20. The access point of claim 9, wherein the frame type comprises a resource allocate request (RAR) request frame.

* * * * *